United States Patent
Irwin, Jr.

(10) Patent No.: US 12,491,429 B2
(45) Date of Patent: *Dec. 9, 2025

(54) IMAGING VIDEO FRAMES ON DOCUMENTS

(71) Applicant: Brightstar Global Solutions Corporation, Providence, RI (US)

(72) Inventor: Kenneth E. Irwin, Jr., Dawsonville, GA (US)

(73) Assignee: Brightstar Global Solutions Corporation, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,616

(22) Filed: Jan. 6, 2025

(65) Prior Publication Data

US 2025/0135324 A1    May 1, 2025

Related U.S. Application Data

(63) Continuation of application No. 18/425,524, filed on Jan. 29, 2024, now Pat. No. 12,214,287, which is a continuation of application No. 18/163,511, filed on Feb. 2, 2023, now Pat. No. 11,918,920, which is a continuation of application No. 17/655,054, filed on Mar. 16, 2022, now Pat. No. 11,583,757.

(51) Int. Cl.
| | |
|---|---|
| *A63F 3/06* | (2006.01) |
| *G06F 3/12* | (2006.01) |
| *G06K 7/14* | (2006.01) |
| *G06T 11/60* | (2006.01) |

(52) U.S. Cl.
CPC .......... *A63F 3/0665* (2013.01); *G06F 3/1205* (2013.01); *G06F 3/1243* (2013.01); *G06K 7/1413* (2013.01); *G06K 7/1417* (2013.01); *G06T 11/60* (2013.01)

(58) Field of Classification Search
CPC .... A63F 3/0665; G06F 3/1205; G06F 3/1243; G06K 7/1413; G06K 7/1417; G06T 11/60
See application file for complete search history.

(56) References Cited

U.S. PATENT DOCUMENTS

| | | |
|---|---|---|
| 6,315,666 B1 | 11/2001 | Mastera et al. |
| 6,464,581 B1 | 10/2002 | Yoseloff et al. |
| 7,374,484 B2 | 5/2008 | Bennett |
| 8,029,353 B2 | 10/2011 | Walker et al. |
| 10,130,869 B2 | 11/2018 | Finnerty et al. |
| 10,183,213 B2 | 1/2019 | Irwin et al. |

(Continued)

OTHER PUBLICATIONS

"New Mexico Launches Star Trek Lottery Scratcher Game", https://trekmovie.com/2011/12/09/new-mexico-launches-star-trek-lottery-scratcher-game/, Dec. 9, 2011.

(Continued)

*Primary Examiner* — Matthew Mikels
(74) *Attorney, Agent, or Firm* — Neal, Gerber & Eisenberg LLP

(57) ABSTRACT

Security-enhanced documents and methods of forming security-enhanced documents having indicia under a Scratch-Off Coating (SOC), and more particularly including digitally imaging video frames onto the display area and/or back of the documents. In certain embodiments, portions of digitally imaged video frames are also utilized as game play variable indicia.

20 Claims, 23 Drawing Sheets

(56) References Cited

U.S. PATENT DOCUMENTS

| | | |
|---|---|---|
| 10,185,522 B2 | 1/2019 | Irwin et al. |
| 10,249,144 B2 | 4/2019 | Irwin |
| 10,456,661 B2 | 10/2019 | Finnerty et al. |
| 11,583,757 B1 * | 2/2023 | Irwin, Jr. ............... G06F 3/1243 |
| 11,918,920 B2 * | 3/2024 | Irwin, Jr. ............... G06F 3/1205 |
| 12,214,287 B2 * | 2/2025 | Irwin, Jr. ............... G06F 3/1243 |
| 2006/0003830 A1 | 1/2006 | Walker et al. |
| 2007/0021185 A1 | 1/2007 | Walker et al. |
| 2008/0039197 A1 | 2/2008 | Walker et al. |
| 2012/0138688 A1 | 6/2012 | Young |
| 2017/0024845 A1 | 1/2017 | Filler et al. |

OTHER PUBLICATIONS

"OLG recalling Bingo tickets over security concern", https://toronto.ctvnews.ca/olg-recalling-bingo-tickets-over-security-concern-1.233201, Mar. 14, 2007.

"Shatner to Launch Star Trek Lottery Game", https://www.startrek.com/article/shatner-to-launch-star-trek-lottery-game, Jan. 29, 2013.

"Star Trek Card Collective", https://jklm.net/startrekcards/2016/12/21/star-trek-lottery-tickets/, Dec. 21, 2016.

"Toronto man cracked the code to scratch-lottery tickets", https://www.thestar.com/news/gta/2011/02/04/toronto_man_cracked_the_code_to_scratchlottery_tickets.html, Feb. 4, 2011.

* cited by examiner

IMAGING VIDEO FRAMES ON DOCUMENTS

PRIORITY

This application is a continuation of, claims priority to and the benefit of U.S. patent application Ser. No. 18/425,524, filed on Jan. 29, 2024, which application is a continuation of, priority to and the benefit of U.S. patent application Ser. No. 18/163,511, filed on Feb. 2, 2023, now U.S. Pat. No. 11,918,920, issued on Mar. 5, 2024, which application is a continuation of, claims priority to and the benefit of U.S. patent application Ser. No. 17/655,054, filed on Mar. 16, 2022, now U.S. Pat. No. 11,583,757, issued on Feb. 21, 2023, the entire contents of each of which are incorporated by reference herein.

BACKGROUND

The present disclosure relates generally to documents, such as scratch off instant lottery tickets, having variable indicia under a Scratch-Off Coating ("SOC"), and more particularly to systems and methods for enhancing aesthetics of such documents by digitally imaging a plurality of video frames onto such documents such as in the front display area and/or the back area of the document. In various embodiments, portions of digitally imaged video frames are also utilized as variable indicia thereby imparting value or game outcomes via the selected portions of digitally imaged video frames.

Lottery games have become a time-honored method of raising revenue for state and federal governments the world over. Traditional scratch-off instant lottery tickets have evolved over decades. Certain known instant lottery tickets have printed images from a video such as a television show or movie. However, due to the inherent limitations of using a static plate printing process (such as flexographic and offset), the quantity of images that can be placed on the lottery tickets is limited by the size (such as the circumference) of the printing plates. Thus, the images from videos for instant lottery tickets have been limited.

BRIEF SUMMARY

Various embodiments of the present disclosure relate to a method for producing multiple security layered Scratch-Off Coating (SOC) protected documents with variable indicia. The method includes creating video frame data based on a video including multiple frames that is received from an external video source, wherein creating the video frame data includes: (i) selecting a plurality of video frames from the video, (ii) converting each selected video frame into a separate video frame file in a format compatible with a Raster Image Processor (RIP), and (iii) saving each separate video frame file in a video frame database such that each separate video frame file is uniquely identified via a separate metadata tag. The method further includes associating separate imaging data with each document, which comprises for each document: (i) creating an unique inventory control and validation numbers for the document, (ii) generating variable indicia for the document, (iii) assigning one of the video frame files to the inventory control and/or validation number for the document, and (iv) flattening the variable indicia, inventory control and/or validation numbers, and selected video frame file into an overall image file for the document. The method further include printing, with a digital imager and associated RIP, each document using the overall image file for the document; and for each document, forming a scratch off coating on top of at least a portion of the variable indicia of the document while leaving a display portion of the document uncovered.

Various embodiments of the present disclosure relate to a method for creating video frame data based on a video including multiple frames that is received from an external video source, wherein the video frame data is configured to be used to produce multiple security layered Scratch-Off Coating (SOC) protected documents with variable indicia. The method includes selecting a plurality of video frames from the video, converting each selected video frame into a separate video frame file in a format compatible with a raster image processor, and saving each separate video frame file in a video frame database such that each separate video frame file is uniquely identified via a separate metadata tag. The method further includes associating and storing separate imaging data with each document, which includes for each document: creating an unique inventory control and validation numbers for the document, generating variable indicia for the document, assigning one of the video frame files to the inventory control and/or validation number for the document, and flattening the variable indicia, inventory control and/or validation numbers, and selected video frame file into an overall image file for the document.

Various embodiments of the present disclosure relate to a method for producing multiple security layered Scratch-Off Coating (SOC) protected documents with variable indicia. The method includes accessing video frame data for each document, the video frame data based on a video including multiple frames, wherein the video frame data is created by: (i) selecting a plurality of video frames from the video, (ii) converting each selected video frame into a separate video frame file in a format compatible with a Raster Image Processor (RIP), and (iii) saving each separate video frame file in a video frame database such that each separate video frame file is uniquely identified via a separate metadata tag. The method further includes accessing separate imaging data associated with each document, which includes for each document: (i) an unique inventory control and validation numbers for the document, (ii) generated variable indicia for the document, (iii) an assigned one of the video frame files for the inventory control and/or validation number for the document, and (iv) flattened variable indicia, inventory control and/or validation numbers, and selected video frame file in an overall image file for the document. The method further includes printing, with a digital imager and associated RIP, each document using the overall image file for the document, and for each document, forming a scratch off coating on top of at least a portion of the variable indicia of the document while leaving a display portion of the document uncovered.

Other objects and advantages of the present disclosure will be set forth in part in the following description, or may be apparent from the description, or may be learned through practice of the invention.

BRIEF DESCRIPTION OF THE SEVERAL VIEWS OF THE DRAWINGS

The foregoing summary, as well as the following detailed description of the present disclosure, will be better understood when read in conjunction with the appended drawings. For the purpose of illustrating the present disclosure, there are shown in the drawings example embodiments. It should be understood, however, that the present disclosure is not limited to the precise arrangements and instrumentalities shown.

DETAILED DESCRIPTION

Figure 1A:
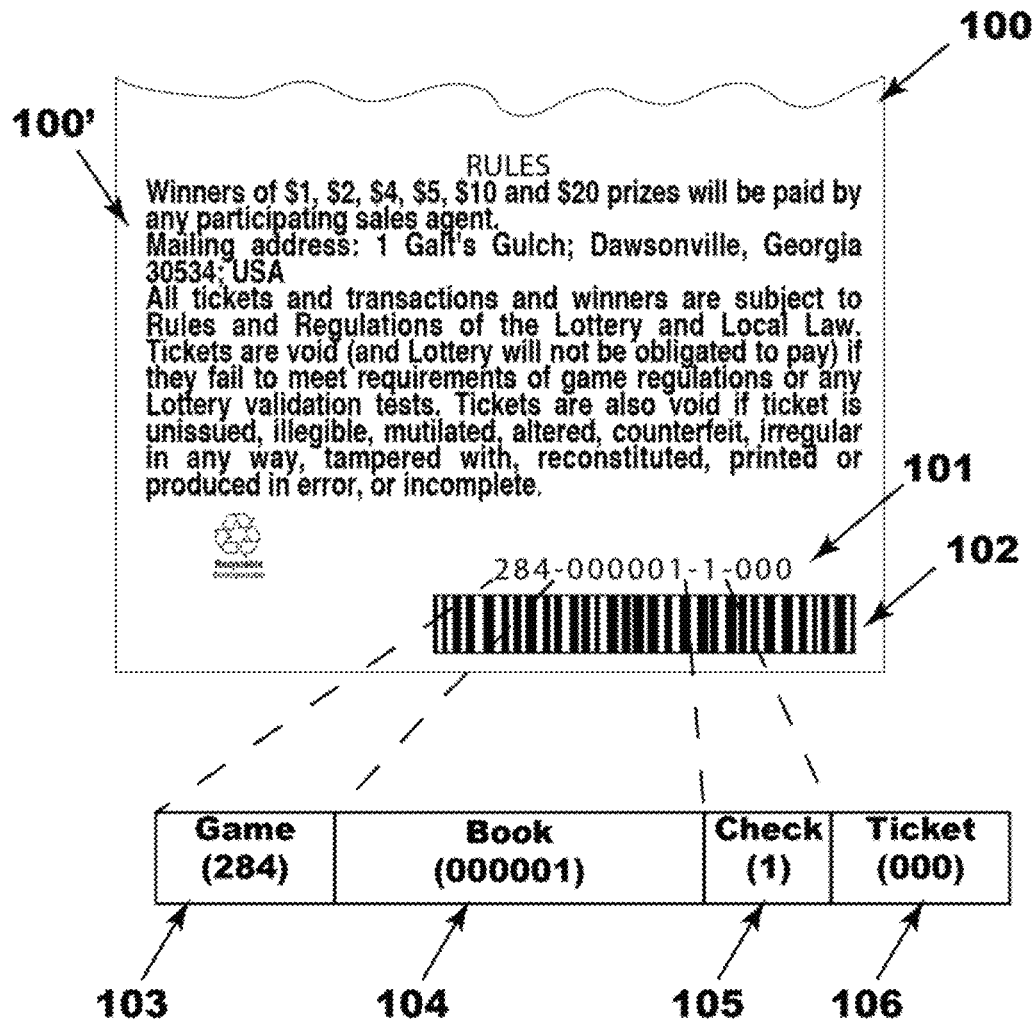
FIG. 1A is a back view of the back of a representative example known instant lottery ticket showing a human readable inventory control number and an associated machine readable barcode.

Certain terminology is used herein for convenience only and is not to be taken as a limitation on the present disclosure.

The words "image" or "print" are used to include directly or indirectly creating indicium or indicia on any substrate via any known or yet to be develop imaging or printing method or equipment. Likewise, "imaging" or "printing" refers to a method directly or indirectly creating the indicium or indicia.

The term "ink jet" often refers to a digital printer that sprays droplets of ink onto a substrate to create an image, but may also refer generically to other apparatus for digitally printing an image on a substrate (such as but not limited to laser printing, solid ink printing, monochromatic ink jet printing, or process color ink jet printing).

The term "scratch-off document" refers to a document having a scratch-off coating such as but not limited to an "instant ticket," a "ticket," a "lottery scratch-off ticket," a "commercial contest scratch ticket," a "telephone card account number card," a "scratch-off gift card", or a "scratch-off card." The terms "instant ticket" or "ticket" may be used to refer to a scratch-off document.

The terms "full-color" and "process color" refer to a variety of colors by discrete combinations of applications of pigmented primary inks or dyes such as the four color "CMYK" (i.e., Cyan, Magenta, Yellow, and black), or in some cases six colors (e.g., Hexachrome printing process uses CMYK inks plus Orange and Green inks), or alternatively eight colors—e.g., CMYK plus lighter shades of cyan (LC), magenta (LM), yellow (LY), and black (YK).

The term "video" or "video frames" refers to a series of static images that are each displayable on a screen (such as for a short time period such as 1/24, 1/25, or 1/30 of a second) and then immediately replaced by the next static image in the series. For various videos or video frames, the persistence of vision blends the displayed static images together, producing the illusion of a moving image. The video or video frames can be obtained from film, analog or digital sources, a series of stop motion still images, or other suitable sources such as but not limited to movies, television shows, programs, series, sporting events, news events, documentaries, historical events, or any other videos (with or without sound) with one or more frames. Additionally, the videos or video frames can be obtained from various different sources including videos submitted by third parties such as but not limited to potential buyers of the instant lottery tickets or other documents.

The term "variable" indicium or indicia refers to imaged indicia that indicates information relating a property, such as but not limited to, a value of a scratch-off document, where the variable indicium or indicia can be hidden by a SOC until the information or value is authorized to be seen, such as by a purchaser of the document who scratches off the SOC, revealing the variable indicium or indicia. Examples of variable indicium include letters, images, symbols, numbers, icons, or figures.

The word "Gen" is an abbreviation for "game generation" and refers to the digital process employed by an instant lottery ticket manufacturer where prizes are assigned to individual lottery tickets in an orderly manner to facilitate auditing and then shuffled through a digital process to pseudo-randomly distribute the prizes throughout a print run among tickets with sequentially assigned inventory control numbers to achieve a predetermined theoretical payout and prize distribution. This Gen process can include a plucking algorithm that removes any "over seeded" tickets (such as redundant printed tickets with high-tier prize values printed to ensure that at least a minimum number of high-tier prize valued tickets remain after culling any printing defects from the print run) prior to packaging.

The term "variable imaging" refers to methods of printing from a digital-based image directly to a variety of documents having a SOC (such as an instant lottery ticket). Thus, as its name implies, "variable imaging" can vary from document-to-document and may include text, icons, drawings, photographs, etc. In various embodiments, commercially available off-the-shelf digital printers (e.g., Memjet, Hewlett Packard or "HP" Indigo, Xerox CiPress series, and Kodak) are capable of performing the "variable imaging" described in the present disclosure.

Before describing various embodiments of the present disclosure, it is useful to first provide a brief description of the known instant lottery ticket production and validation. This description of the current state of the art of instant ticket production and validation is provided in the discussions of FIGS. 1A thru 1D.

FIG. 1A depicts a representative example of a known variable human readable inventory control number 101 and the associated barcode 102 on the ticket back 100' of a known printed instant lottery ticket 100. As shown in FIG. 1A, the variable printed human readable inventory control number and the associated barcode are imaged on the ticket back 100' and therefore accessible to the retailer prior to purchase of the ticket 100. FIG. 1A also shows a taxonomy of a typical instant lottery ticket's human readable inventory control number's 101 data structure: starting with a three or four decimal digit game number 103 identifying the game (three decimal digits as shown in FIG. 1A), followed by a variable length sequential book number 104 (six decimal digits as shown in FIG. 1A), a one or two digit modulo check number 105 (one decimal digit as shown in FIG. 1A), and a variable sequential digit ticket number 106 (three decimal digits as shown in FIG. 1A) uniquely identifying the lottery ticket 100 to the lottery system (not shown).

The taxonomy of the instant ticket's barcode 102 data is similar to the human readable inventory control number 101 with the barcode 102 and human readable images embodying identical inventory control data 103 through 106; however, the barcode 102 optionally can embody other data in addition to the inventory control data.

The instant ticket inventory control data 103 through 106 found on the ticket back 100' is accessible to the retailer and others prior to purchase and play of the ticket (prior to removal of the SOC of the ticket). This is because, as its name implies, the instant ticket inventory control data 103 through 106 embodied as human readable inventory control number indicia 101 and barcode 102 indicia are used for tracking the individual lottery ticket 100 through its life cycle of production, warehouse storage, shipping, book activation by the retailer, sale, and optionally redemption. Therefore, for security reasons against retailer pick-out, there are no cleartext win or lose information embedded in the instant ticket human readable number 101 or machine-readable barcode 102. Win or lose validation information can be included in the machine-readable barcode 102, but this information is encoded as ciphertext and not accessible in a cleartext format on an unplayed lottery ticket.

Figure 1B:
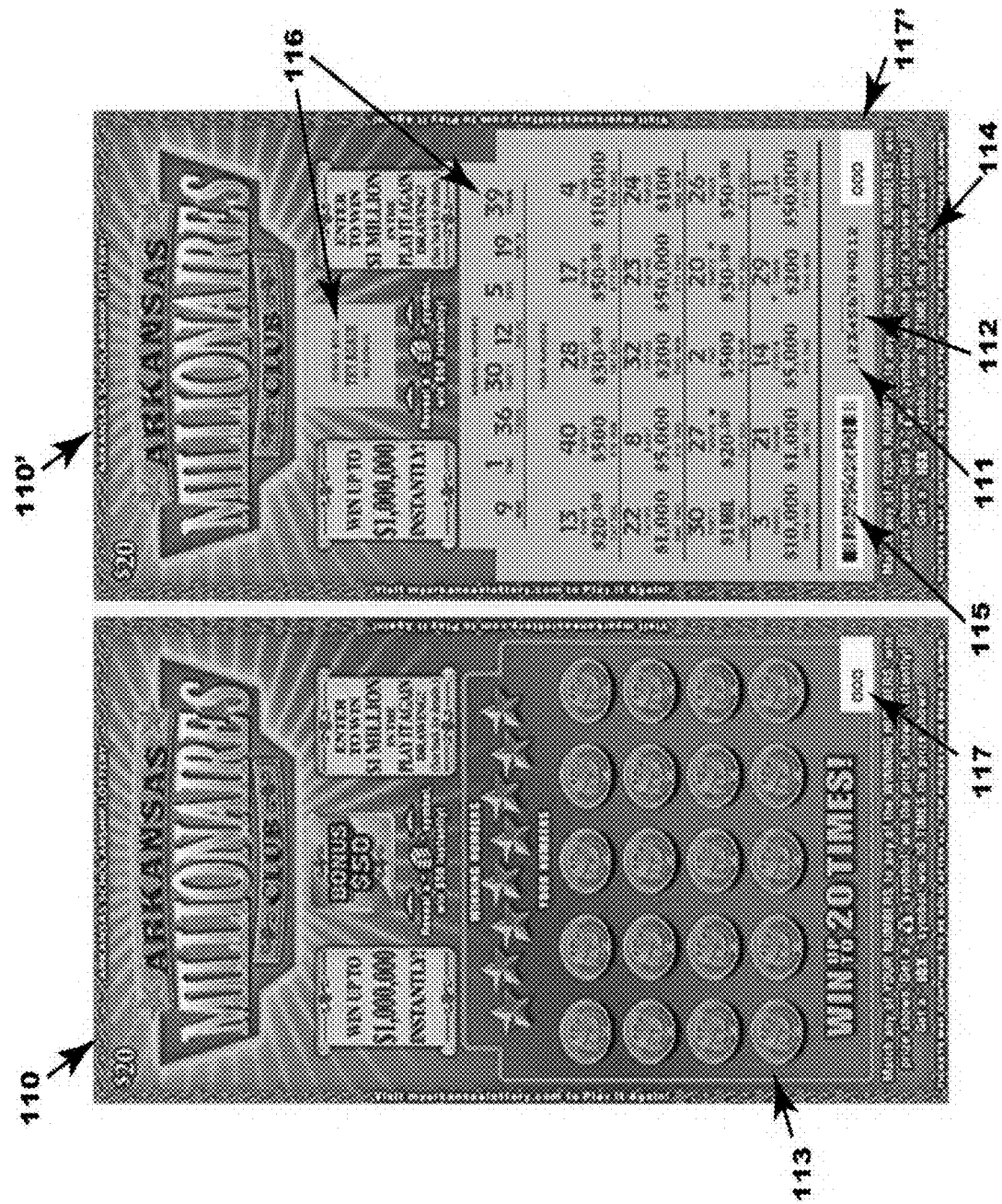
FIG. 1B is a front view of the representative example known instant lottery ticket of FIG. 1A showing the ticket with the variable indicia covered by a Scratch-Off Coating ("SOC") and variable indicia seen after the SOC is removed.

FIG. 1B depicts representative examples of an unplayed instant lottery ticket 110 and a played instant lottery ticket 110' (with all of the SOC removed). As shown in FIG. 1B, the variable validation number 111 is imaged beneath the ticket's SOC 113 and is therefore only accessible after the lottery ticket has been purchased and played. Part of the validation number 111 can include a series of three or four boxed decimal digits 112 that can be used to verify that the lottery ticket 110 has been properly played during validation and redemption. Again, since the validation number 111 and associated boxed digits 112 are covered by the SOC 113 of an unpurchased lottery ticket, this data is theoretically inaccessible until the lottery ticket is purchased and played. In addition to the validation number 111, human readable game play indicia 116 are also imaged under the SOC 113, providing the human with game play and associated win or lose information. The validation barcode 115 can also be imaged under the SOC 113, thereby enabling expedited redemption of winning lottery tickets by scanning. As above, this validation barcode 115 is covered by the SOC on unsold lottery tickets, thereby preventing each lottery ticket from being scanned until that lottery ticket is purchased and played.

The front of the lottery ticket can also include the imaged ticket number 117 and 117' that should be identical to the lottery ticket number 106 (FIG. 1A) imaged on the ticket back 100'. This double back 100' and front 110 ticket number 117 and 117' imaging aids the retailer in inventory control, as well as providing a quality assurance check during production to ensure that the front and back imagers are in synchronization.

Figure 1C:
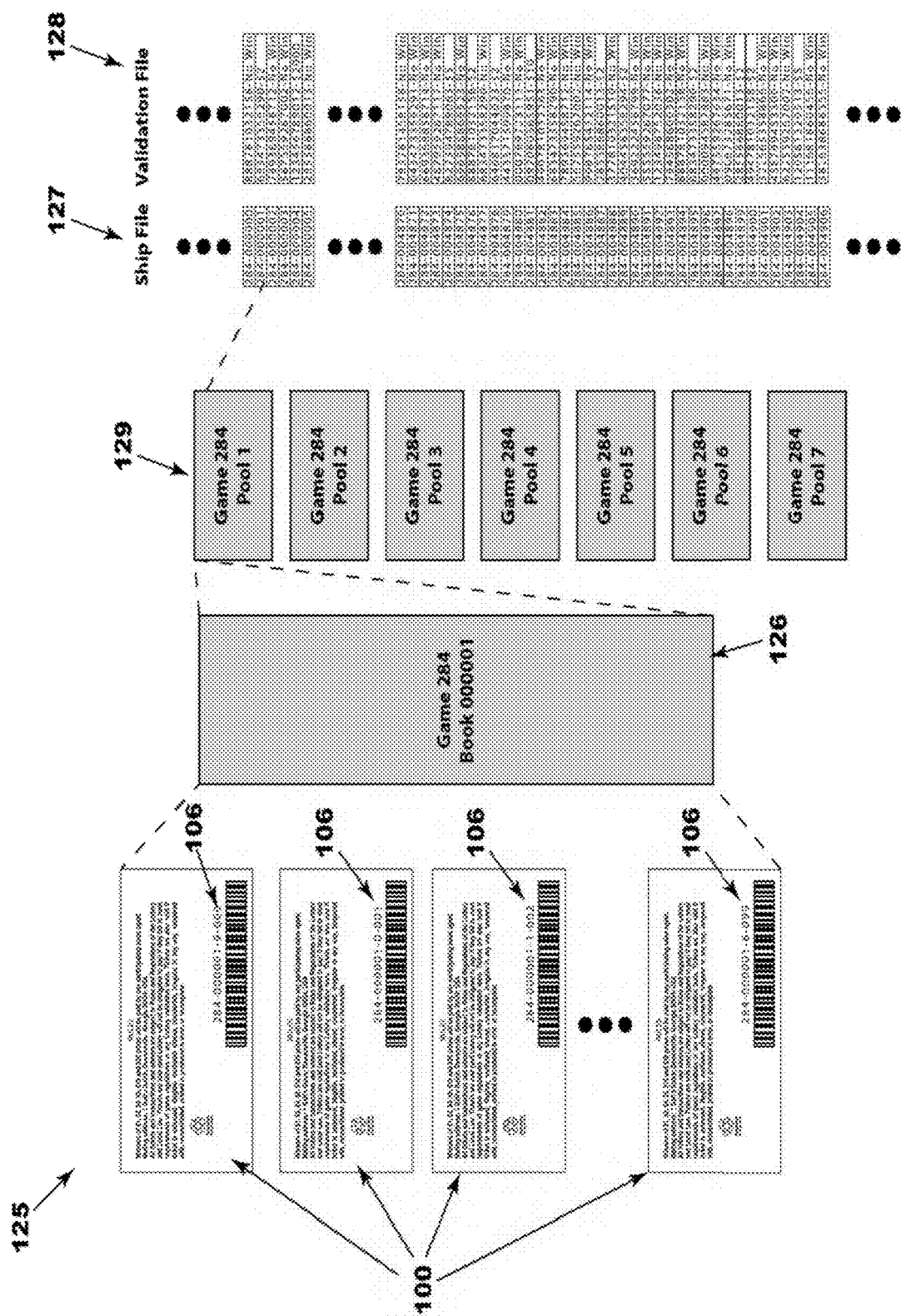
FIG. 1C is a block diagram of a representative example of known instant lottery tickets logistically arranged with respect to a Gen system.
Figure 1D:
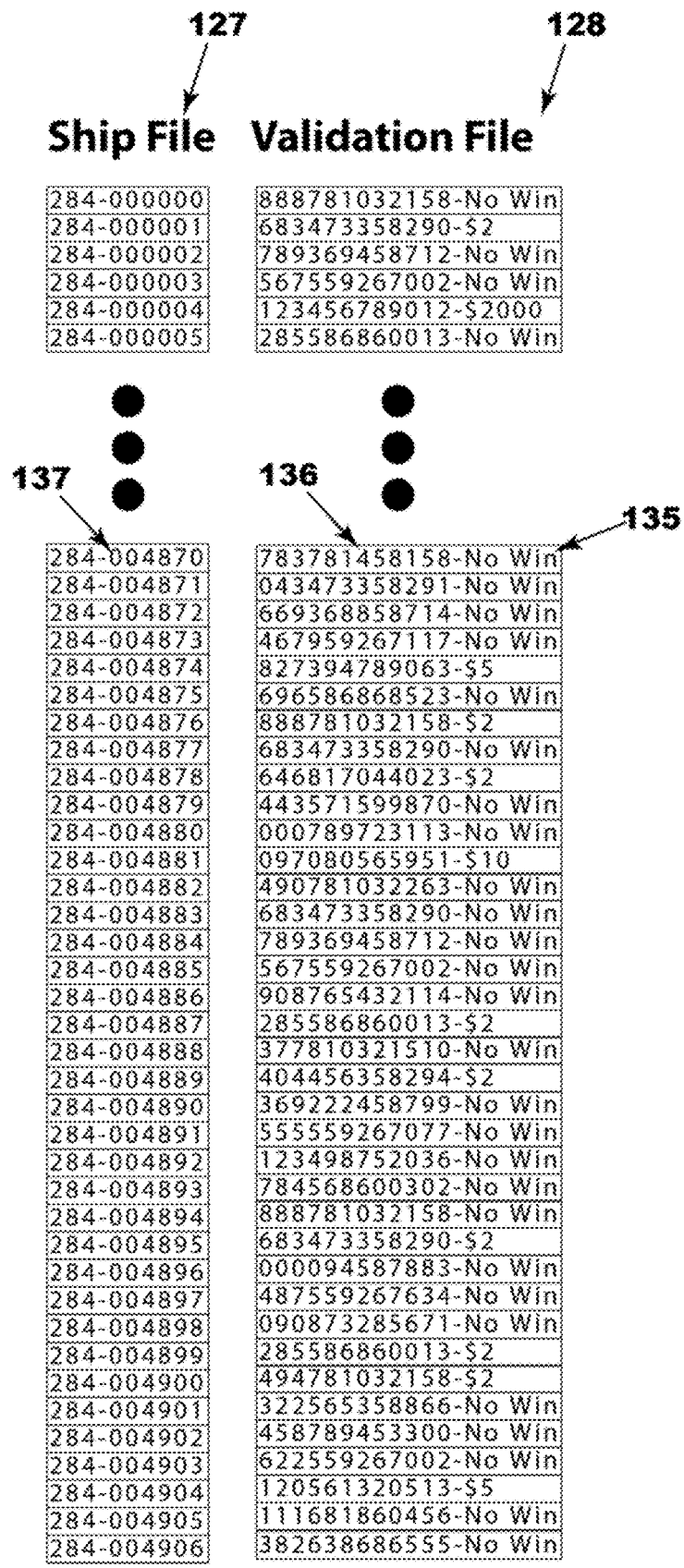
FIG. 1D is a magnified view of the representative example of the ship and validation files for the example lottery tickets of FIG. 1C.

Referring to FIG. 1C, at the system level 125, example logistical tracking, activation, and validation of instant lottery tickets 100 are accomplished by grouping tickets together in books 126. A magnified view of the instant ticket 100 is provided in FIG. 1A and a magnified view of the Ship 127 and Validation 128 files is provided in FIG. 1D. The quantity of lottery tickets per book (one-hundred as illustrated by the human readable ticket numbers 106, incrementing from "000" to "099") can vary depending on the game and lottery ticket retail value, but all lottery tickets 100 in a book 126 can have sequential inventory control numbers 101 (such as shown in FIG. 1A) assigned by the Gen. There are several reasons for arranging instant lottery tickets in books. A primary reason is that instant lottery tickets 100 are ordered and shipped in books 126 with the book 126 being the fundamental unit of reconciliation. Since instant lottery tickets 100 are shipped in books 126, the book 126 is also the fundamental unit of activation on the overall instant ticket system 125. In other words, there is typically no individual lottery ticket level of activation. The smallest quantization of activation on a typical instant ticket system 125 is at the book 126 level. Thus, when a retailer receives a new book of lottery tickets 126, the retailer must first activate the book 126 on the lottery gaming system 125 before placing the lottery tickets on sale. Book 126 level activation thereby enables instant lottery tickets to be shipped via common carrier since un-activated or stolen books 126 would be automatically flagged on the system 125 with any lottery tickets 100 in the book 126 detected as probably stolen if redemption was attempted.

In addition to shipping, reconciliation, and activation some lottery games may be structured at the Gen such that there are a specified minimum number of and/or types of winners within a book 126. In such case, arrangement of winning tickets is not truly random, but are randomly distributed within a defined structure to ensure that all retailers receive approximately the same number of low- and mid-tier winners per book as well as to aid in ensuring sufficient cash is on hand for paying low- and mid-tier prizes.

A given quantity of books 126 are then arranged on the Gen system 125 as a pool 129. The purpose of a pool 129 is to reconcile all low- and mid-tier (and possibly high-tier) prizes into a predetermined prize structure. While the size of a pool 129 can vary from game-to-game, the pool 129 is sufficiently large to inhibit tracking unsold winning tickets by the public.

All of the produced books 126 for a given game are logged in a digital ship file 127 by the ticket manufacturer and loaded on the system 125 prior to the lottery game being placed on sale. The ship file contains a listing of all the manufactured books 126 and 137 (FIGS. 1C and 1D, respectively) identifying (typically by omission) any book 126 and 137 numbers that were destroyed or omitted in the manufacturing process. As the lottery tickets for a game are placed on sale, the ship file is routinely expanded with information such as: "book 'X' shipped to retailer 'Y', "book 'X' activated," "book 'X' stolen," etc. Thus, the ship file enables logistical tracking of all manufactured books 126 in an instant ticket game; however, the ship file 127 does not contain any win or lose information and cannot be linked (without appropriate cryptographic seeds or keys) to the validation file 128.

The validation file 128 contains the validation numbers or codes 111 and 136 (FIGS. 1B and 1D, respectively) for all lottery tickets within a game with the validation numbers or codes 111 and 136 effectively providing pointers to the prize value (if any—such as callout 135 of FIG. 1D) of a ticket 110 and 110' on the system 125. Since the validation numbers or codes 111 and 136 essentially function as pointers to the prize values 135, every validation code 111 and 136 must be unique within the validation file 128. Once the unique validation numbers or codes 111 and 136 are generated, a separate ticket mixer or shuffle algorithm determines the (typically one byte) prize code 135 assigned to each validation code 111 and 136 thereby determining each ticket's value (if any).

As previously discussed, the printed validation code 111 (FIG. 1B) is inaccessible with un-played or unsold tickets due to it being covered by SOC 113. The validation code can also be embodied in a barcode 115 hidden under the SOC 113 that cannot be scanned until the ticket is played. Alternatively, there can be additional validation file 128 data (other than inventory control) in the ticket back barcode 102 (FIG. 1A) in an encrypted format where the boxed digits 112 (FIG. 1B) enable decryption, etc. However, the validation code 111 is inaccessible on un-played or unsold tickets 100. Therefore, the security of the system 125 (FIG. 1C) is derived from the validation file 128 being unassociated with the ship file 127, as well as the physical unplayed tickets' inventory control information 101 and 102 (FIG. 1A).

Both the ship 127 file and the validation file 128 are generated by the instant ticket manufacturer before the tickets are shipped. Known lottery logistical and validation systems 125 currently require the ship file 127 and validation file 128 to be loaded on the system 125 prior to instant lottery tickets being shipped to retailers and placed on sale. Once loaded onto the system 125, the basic validation file 128 typically cannot be altered (other than optional flagged additions—e.g., redeemed, stolen, etc.), thereby ensuring the integrity of the instant ticket game and its predetermined payout.

Reference will now be made in detail to examples of the present disclosure, one or more embodiments of which are illustrated in the drawings. Each example is provided by way of explanation of the present disclosure, and not meant as a limitation of the present disclosure. For example, features illustrated or described as part of one embodiment, may be used with another embodiment to yield still a further embodiment. It is intended that the present disclosure encompass these and other modifications and variations as come within the scope and spirit of the present disclosure.

In various embodiments, the present disclosure relates to selecting one or more video images and printing, using a high-resolution digital imager, the selected video image(s) on a substrate of a scratch-off secured instant lottery ticket or other document. In various embodiments, the printing of the video image(s) on the front display and/or back portions of the substrate of the scratch-off secured instant lottery ticket is accomplished by: selecting data from one or more video frames from an external video source, converting the selected video frames into separate individual files that are in a format compatible with a Raster Image Processor ("RIP"), saving each separate individual video frame file into a database, performing an instant lottery ticket Gen including assigning variable indicia as well as unique inventory control and validation numbers to each lottery ticket in the Gen, accessing at least one video frame file from the database to assign the at least one video frame file to a particular lottery ticket in the Gen, flattening the at least one video frame file and the ticket's Gen data into a new file, printing the new file using the RIP and an associated digital imager, and covering at least some of the printed variable indicia portion with one or more SOCs.

In various embodiments of the present disclosure, a high-resolution digital imager is utilized to print the front display and variable indicia of each instant lottery ticket including flattened video frames such as from a video (such as but not limited to a licensed television show or movie). These embodiments having the advantage of reproduction on the printed ticket of the video frames from the video as well as associated themed variable indicia with the potential disadvantage of the added costs for ink and the associated high-resolution digital imager.

In various alternate embodiments, the front display, and/or the back, and/or overprint portion of the instant lottery ticket or document also include printed video frames. In various such alternative embodiments, the high-resolution digital imager prints in process color. In certain of these embodiments, the video frame(s) are assigned to each individual instant ticket during preprocessing such that the press' RIP is not burdened excessively in real time. In various such embodiments, the assignment process includes every video frame or a subset of video frames from a video (such as a television show or movie) assigned in a chronologically sequential or pseudorandom arrangement to each instant ticket relative to the instant ticket's inventory control number.

In various other embodiments of the present disclosure, additional ancillary data (such as but not limited to written dialog, scene description, and/or time tag of video frame) associated with each video frame of the external video source (such as the licensed television show or movie) is garnered and saved in a database along with the video frame(s). Thus, with these embodiments, the additional ancillary data can be flattened onto a portion of the video frames with the composite video and ancillary data digital image assigned to each individual instant ticket and ultimately flattened with the ticket's Gen data into a new file suitable for printing. In various such embodiments, the ancillary data can be imaged onto a separate portion of each instant lottery ticket (e.g., back, overprint) rather than flattened onto the portion with the assigned video frame. In various embodiments, machine readable indicia (e.g., Quick Response or "QR" code, Portable Data Format or "PDF" two-dimensional barcode) are included as at least a portion of the ancillary data that, when scanned, would command a consumer's personal device (such as an iPhone® mobile device, an Android® mobile device, or an iPad® mobile device) to display, via an Internet web browser or custom application, a short video snippet of the actual video (such as the television show or movie) generally centered around the time frame of the printed video frame (such as five to ten seconds before and/or after the printed video frame).

In various embodiments of the present disclosure, the variable indicia denoting winning or losing status or value of the lottery ticket or document are thematically related to the video frame printed on the same lottery ticket or document. Through this embodiment, the variable indicia can include artist renderings of portions of the video frame, word or words related to the dialog occurring at the time of the video frame, actual portions of the video frame itself, or any other desired information. Regardless of the type of thematically related variable indicia utilized, the variable indicia images or symbols can be stored and ultimately extracted from an ancillary data depository. In various embodiments, a plurality of thematically related variable indicia can be provided in excess of the quantity of variable indicia required to be printed on each lottery ticket thereby enhancing security and game play. In various such embodiments, the thematically related variable indicia can be saved in the ancillary data depository as symbols.

In various embodiments, of the present disclosure, a plurality of portions of the same or different related video frames are imaged in separate SOC overprint regions of the lottery ticket or document. Similar to the third embodiment, the plurality of portions of the same or different related video frames that are imaged in separate SOC overprint regions can be thematically related to the video frame printed on the same lottery ticket or document. In certain specific embodiments, videos can be submitted by third parties such as potential buyers of the lottery tickets.

Described herein are a number of systems and methods for reliably producing scratch-off instant lottery tickets or other documents with integrated video frames imaged at least on a portion of the ticket or document. Although the examples provided herein are primarily related to instant lottery tickets, it should be clear that the present disclosure is applicable to any type of scratch-off specialized games or other security-enhanced documents.

Figure 2A:
FIG. 2A shows front and back views of a representative example of an instant lottery ticket with printed video frames of an example movie providing one example embodiment of the present disclosure.

FIG. 2A shows an instant lottery ticket front 200 and an instant lottery ticket back 201 enhanced with a printed video frame 202 on the front 200 and a separate printed video frame 203 on the back 201. This exemplary instant lottery ticket provides a representative example of one embodiment of the present disclosure. As illustrated in FIG. 2A, the instant ticket back 201 includes an inventory control number in both human and machine readable formats (101' and 102', respectively) as well as a synchronized human readable ticket number 117" displayed in a "knock out" area of the SOC 113' on the ticket front 200.

In various embodiments of the present disclosure, a process digital imager is utilized to print the entire front of the instant ticket including the variable indicia and video frames 202 from a video (such as in this example a movie) from a single flattened file in one pass. In various embodiments, a second process digital imager is used to print the entire back of the instant ticket in a similar manner. In certain embodiments, the digital imagers print in process color. In certain embodiments, the video frames are assigned to each individual instant ticket during preprocessing such that the press Raster Image Processor ("RIP") is not burdened excessively during real time printing of the instant tickets. In certain embodiments, the assignment process includes assigning every or periodic video frame(s) of the video (such as the movie) in a chronologically sequential process relative to the instant ticket's inventory control number 101' (or 102'), such that the first ticket printed would display approximately the first video frame of the video with the last ticket printed displaying approximately the last video frame. Alternatively, the video frames can be assigned in a random or pseudo-random arrangement to each ticket relative to the ticket's inventory control number 101' (or 102'), thereby imparting a sense of anticipation and/or surprise for the ticket purchaser. Various embodiments thus provide the advantage of full color reproduction of the video frames as well as full color variable indicia (but can have the disadvantage of the added costs for process color ink, increased RIP bandwidth, and the associated digital imager). In alternative embodiments, a monochromatic digital imager can be utilized to display only grayscale video frames and variable indicia instead of a process color imager with the advantage of typically lower cost and reduced bandwidth.

Thus, with the exemplary disclosure of FIG. 2A, new gaming methodologies involving a plurality of captured video frames printed on instant tickets enable game designers to tailor new games to a wider variety of targeted segments (e.g., enthusiasts of the video and not necessarily instant tickets per se) not necessarily served by commercially available gaming offerings, thereby appealing to a broader base of consumers. Additionally, printing a plurality of video frames on instant tickets or other documents enables unique marketing opportunities that can be independent of prize fund considerations. For example, if a license arrangement is agreed to before the release of a new video such as a movie, instant tickets can be put on sale featuring all, a portion, or a substantial portion of the video frames before or at the same time as the initial release of the associated video. With this type of coordinated release of tickets and video debut, enthusiasts can purchase tickets largely independent of concern for the prize fund or associated winnings. In other words, the printing of a plurality of video frames such as from a licensed movie creates a form of uniqueness and scarcity since the consumer knows that the consumer may never see that particular video frame again on another instant lottery ticket. Consequently, the consumer may be more likely to take a chance on an instant ticket game while possibly finding a new source to be entertained.

If every frame within a video such as a movie is printed on instant tickets, some consumers may purchase tickets in an attempt to own select video frames around favorite scenes. If the video frames are printed in chronological sequential fashion, this can even stimulate ticket purchases long after the initial release of the game since some players may attempt to acquire climatic scenes near the end of a video such as the end of a movie. While the volume of data required to print every video frame of a movie is substantially greater than for most commercially available instant lottery tickets, with modern non-volatile memory capacities the volume of data is manageable even for a full color feature length movie. For example, a typical movie may have a frame rate of 24 frames per second, with a two hour movie containing at least 24*60*60*2=172,800 video frames. At a full 1600×1600 dpi (dots per inch) resolution, a 4×4 inch printed video frame would require 163.84 megabytes (MB) storage without compression. Thus, it is expected a two hour movie would require 172,800 video frames*163.84 MB=28 terabytes (TB) as a worst case.

Since a 16 TB internal non-volatile memory hard drive may currently be procured for a reasonable amount (such as under $500), the present disclosure contemplates that given the vast resources of computing hardware currently available, storing and imaging feature length movies frame by frame is both feasible and economical (even for relatively long videos). Additionally, the present disclosure contemplates that the printing resolution can be reduced (e.g., 1600×800 dpi) or if video data compression techniques are employed (e.g., Motion Pictures Expert Group or "MPEG"), the data storage requirements can be reduced by a factor of two to one hundred or more.

Figure 2B:
FIG. 2B shows front and back views of an enhancement of the representative example instant lottery ticket of FIG. 2A with printed video frames including ancillary data.

FIG. 2B is a front view of a representative example of the enhanced ticket front 200 and ticket back 201 including printed video frames 202 and 203, respectively of FIG. 2A, with the addition of ancillary data 205, 206, 207, and 208 shown in FIG. 2B augmenting the printed video frames 202 and 203. As illustrated in FIG. 2B, the printed video frames 202 and 203 of FIG. 2A are enhanced with the inclusion of ancillary data and specifically the associated textual dialog 205 and 206 occurring around the printed video frame chronological time in the video (such as the movie in this example) as well as the actual chronological time 207 and 208 the video frame occurred in the video. In this embodiment, the ancillary data provides related information to the printed video frame (such as but not limited to printed textual dialog, chronological time tag of a frame in the video, facts about the video frame image, and historical context) that can increase the perceived value of the printed image. The ancillary data is saved in a database that may or may not be the same database where the video frames are stored. Regardless of the database structure and implementation, in various embodiments, the ancillary data is linked to each video frame in the database (e.g., chronological time, two-dimensional array) such that the associated ancillary data can be readily retrieved at the time the video frame is selected.

In such embodiments, the additional ancillary image data 205, 206, 207, and 208 can be garnered with the selected data associated with the video frames 202 and 203 and assigned to each individual instant ticket, ultimately being flattened with the ticket's Gen data (related to, for example variable indicia, display, ticket back legal, and/or ticket overprint) into a combined composite file for printing by a RIP. In one example embodiment, the ancillary data can be imaged onto a separate portion of each instant ticket (e.g., back, overprint) rather than flattened onto the same portion with the respective assigned video frame.

Figure 2C:
FIG. 2C shows front and back views of enhanced representative example instant lottery ticket of FIGS. 2A and 2B with the addition of a QR ("Quick Response") code providing an Internet link to a short video encompassing certain portions of the movie that occur around the video frames printed on the ticket.

In another embodiment shown in FIG. 2C, ancillary data can include machine readable indicium 209 (e.g., Quick Response or "QR code", Portable Data Format 417 or "PDF-417", or other two-dimensional barcode formats) on at least a portion of the printed ticket or other document. The ancillary machine readable indicium 209 can provide data for a consumer's personal device (e.g., iPhone®, Android®, iPad®) to access additional information related to the video frame from the Internet. For example, as illustrated in FIG. 2C, the ancillary machine readable indicium 209 when accessed can cause a consumer's personal device to receive and display a short video snippet of the actual video such as the movie in the chronological time period around the printed video frame (e.g., five to ten seconds video before and/or after the printed video frame) via an Internet web browser or custom application. In a second related example, the ancillary machine readable indicium 209 can enable Internet viewing of snippets, documentaries, or mini-episodes from movies related to the video frames that therebefore have or have not been viewed by the general public. With this example, if the consumer views the snippet, documentary, or mini-episode, the consumer could be offered optional purchase or subscription options for the entire video, or if the consumer is already a customer of the service sponsoring the snippet or mini-episode (e.g., Netflix, Amazon Prime, or HBO) a chance to login and start watching around the chronological time or episode of the video frame that was printed on the instant ticket. The machine readable indicium can be optionally covered with a SOC thereby allowing only consumers who have purchased a ticket and removed that portion of the SOC to view the snippet or mini-episode.

Figure 2D:
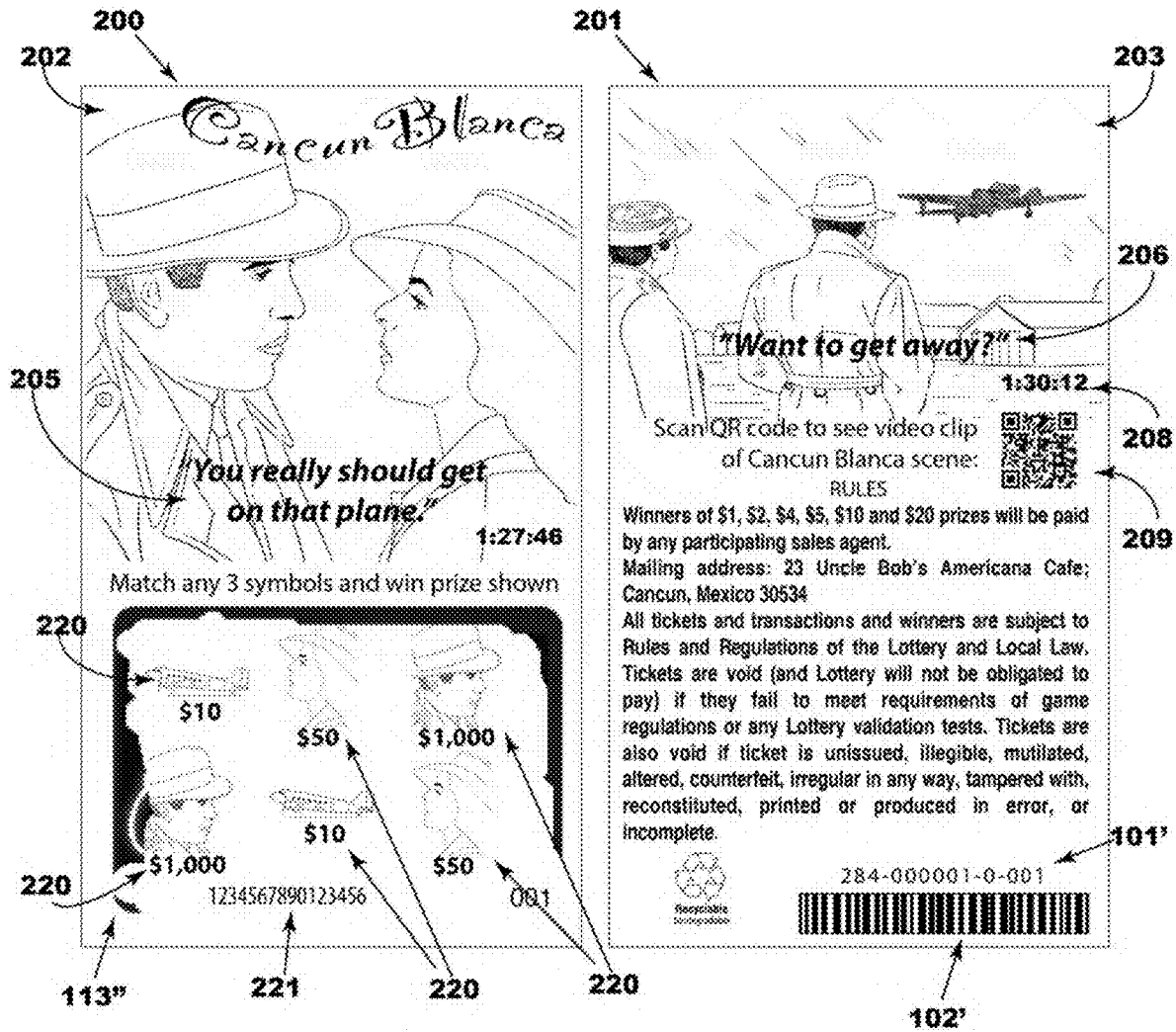
FIG. 2D shows front and back views of a representative example of the enhanced instant lottery ticket of FIGS. 2A thru 2C illustrating the SOC of the ticket partially removed revealing thematically related variable indicia.

This is not to say that ancillary data of the printed video frame need only manifest itself as dialog, time tags, or Internet hyperlinks; in a further alternative embodiment, the variable indicia denoting the value of the ticket may be thematically related to the video frame printed on the same ticket. With this alternative embodiment, the variable indicia could be artist renderings of portions of the video frame, word or words related to the dialog occurring at the time of the video frame, actual portions of the video frame itself, etc. For example, FIG. 2D illustrates variable indicia 220 that are thematically related to the video frame 202 printed on the front of the ticket 200. As shown in FIG. 2D, these variable indicia 220 are thematically related to the video frames 202 and 203 printed on the ticket front 200 and/or ticket back 201.

Regardless of the type of thematically related variable indicia utilized, the variable indicia images or symbols can be stored and ultimately extracted from the ancillary data depository. In this alternative embodiment, a plurality of thematically related variable indicia can be provided in excess of the quantity of variable indicia required to be printed on any given ticket to ensure variety of game play. In various embodiments, the plurality of thematically related variable indicia are saved in the ancillary data depository as symbols. The Gen's ticket mixer or shuffle algorithm assigning the value to each ticket's validation code 221 with the Gen process then accessing the ancillary data thematically related variable indicia symbols 220 and arranging the symbols in a pattern on the ticket equating to the value assigned by the ticket mixer or shuffle algorithm.

In various embodiments, video frames from different chronological time periods or scenes of the video (such as the movie) can be associated with different sets of variable indicia or symbols stored in the ancillary data depository. For efficiency, all of the variable indicia symbols can be stored in the same general location of ancillary data memory with the desired sets defined by groupings of assigned symbol numbers. For example, ten symbols numbered X thru Y in ancillary memory could be associated with the scene of FIG. 2E with a subset of those symbols 220' selected by the Gen process associated with validation code 221' to correctly depict a winning or losing pattern, while ten symbols numbered A thru B could be associated with the scene of FIG. 2D resulting in a different variable indicia pattern 220 assigned to validation code 221.

As described above, the printing of a plurality of video frames from a video can create a form of uniqueness and scarcity since the consumer knows that the consumer may never have the opportunity to purchase that particular video frame representation again. The consumer may retain non-winning tickets to retain the printed video frame memorabilia. If the consumer purchases a winning ticket, the consumer may feel conflicted whether to surrender a unique printed video frame to redeem a prize, particularly if the award was a low-tier prize. In various embodiments, a perforation 222 such as shown in FIG. 2F may be added to the ticket thereby delineating the collectable portion of the ticket with the unique video frame from the gaming portion of the ticket that needs to be surrendered to obtain the award. The perforation 222 enables gaming portion for a winning ticket to be redeemed while the consumer is still able to keep the collectable portion of the ticket since the inventory control number and validation number indicia are printed on the non-collectable, detachable, and redeemable gaming portion.

The present disclosure further contemplates digital imaging of SOC over one or more of the video frames or portions thereof on the ticket. In various embodiment, these SOC overprint video frames could be provided in addition to a ticket display area (such as a front non-scratch-off portion of the ticket) and/or back printed video frame. For example, FIG. 2G illustrates the front 250 and back 251 of an instant ticket with a plurality of printed video frames from an exemplary television game show. As shown in FIG. 2G, the front ticket 250 display portion features a close-up printed video frame 252 of the television series host with a question, and the back ticket portion 251 includes a printed long shot video frame 253 from the television series at approximately the same time as the front video frame 252. Additionally, SOC overprint video frames 254, 255, and 256 denote three discrete scratch-off areas with each area featuring a close-up portion of a video frame of a different one of each of the three contestants. Thus, five different related video frame images are printed on the same instant ticket of FIG. 2G including: the overprint images 254, 255, and 256 utilized as part of game play with the overprint additionally denoting that image 254 as "Contestant 1 Your Contestant" 257 thereby signifying that a correct answer from "Contestant 1" will determine if the ticket wins assuming "Contest 1" answers the question correctly with "Contestant 2" 258 and "Contestant 3" 259 effectively assigned as potential losing scratch-off areas if they contain the correct answer to the question after the SOC is removed.

In various embodiments, the coordination of various video frames onto a single lottery ticket can be accomplished via database access triggered from one anchor video frame with the associated subsequent video frames keyed off of the anchor video frame. In various such embodiments, a primary key video frame such as video frame 252 can be assigned to a given ticket's validation code or inventory control number by one process as part of the Gen. At this point, a second process can classify the anchor video frame 252 and access subsequent video frames 253, 254, 255, and 256 or portions thereof from the video database. These subsequent video frames can be determined algorithmically (e.g., key frame X chronological frame time, frame Y=X+10 seconds, frame Z a subset of frame Y, frame A is a static video image associated with key frame X) or by another process with the output information stored in the ancillary database. When at least one of the video frames impacts game play, as does the contestant SOC overprint video frames 254, 255, and 256 of FIG. 2G, another process (such as mixer or shuffle process) can be used to determine these video frame(s) selections during the Gen.

When video frames printed on SOC overprints that are utilized as a part of game play, the underling variable indicia layout should be cognizant of the printed video frame SOC overprint. For example, FIG. 2H illustrates the same ticket front 250 as in FIG. 2G with all of the SOC removed revealing underlying variable indicia video frames 254', 255', and 256' as well as separate text 257', 258', and 259' respectively. As shown in FIG. 2H, the variable indicia 254' and 257' associated with 'Your Contestant' 254 of FIG. 2G is cognizant of the 254 SOC overprint. In other words, the 254 overprint denotes the variable indicia 254' and 257' of FIG. 2H printed underneath as determining the winning or losing status of the lottery ticket, thus concordance between the overprint video frame and the underlying variable indicia video frame is provided. In various embodiments, the variable indicia video frame portions 254, 255, and 256 of FIG. 2G and 254', 255', and 256' of FIG. 2H remain unaltered between the overprint and the lower variable indicia with additional variable indicia ancillary data 257, 258, and 259 of FIG. 2G and 257', 258', and 259' of FIG. 2H superimposed and flattened on top of the video frames.

The illustrations of FIGS. 2G and 2H utilize the same contestant close up images 254, 255, and 256 printed as the overprint with 254', 255', and 256' printed as portions of the variable indicia for both the overprint and the variable indicia. Thus, the act of scratching-off the overprint images 254, 255, and 256 creates a "dissolve" effect ultimately revealing if the ticket is a winner or non-winner. While this "dissolve" effect is provided in some circumstances (such as the exemplary television quiz show of FIGS. 2G and 2H), this should not be interpreted as the only arrangement of portions of video frames from a video for the overprint and variable indicia compatible with this disclosure.

Figure 2E:
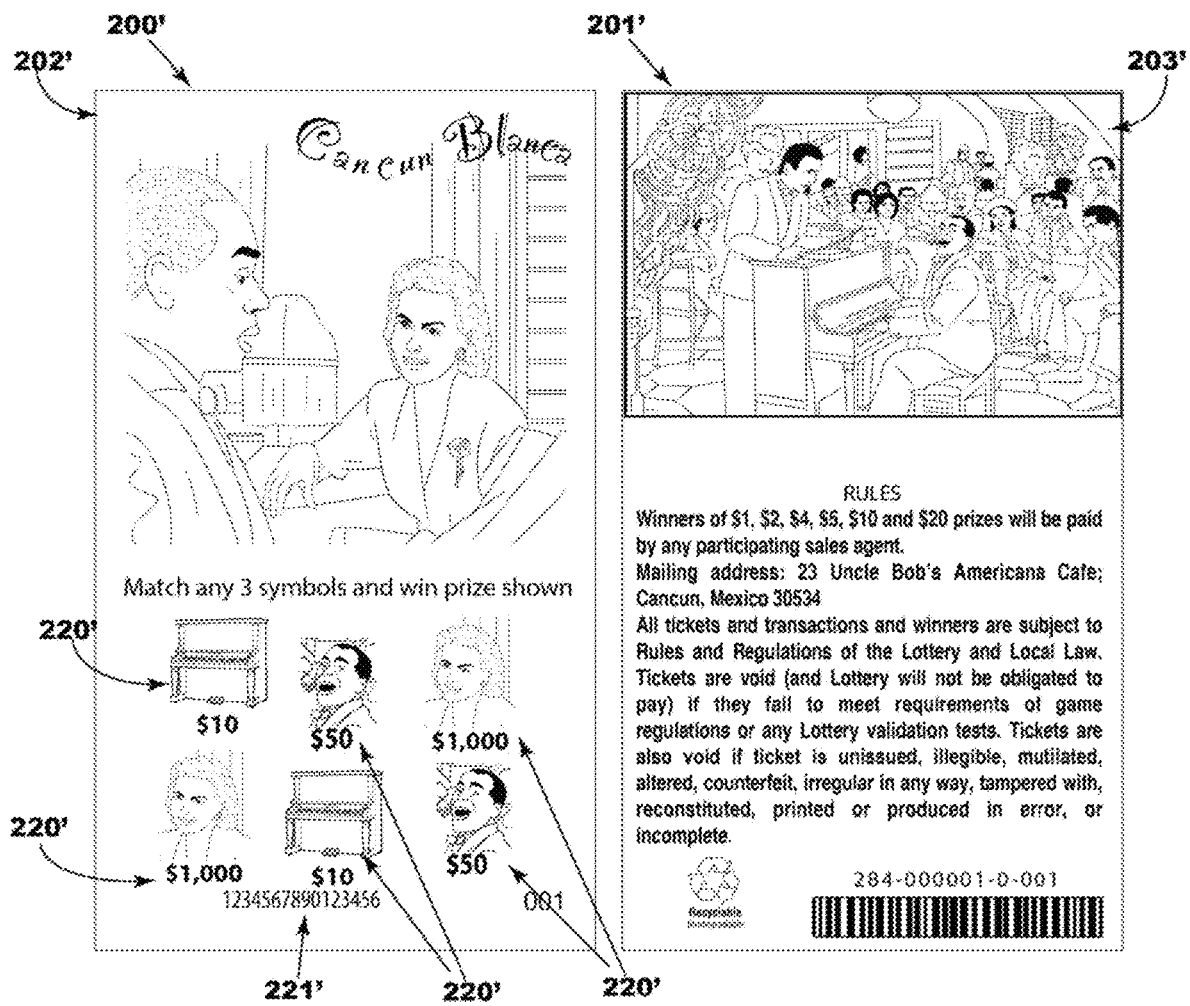
FIG. 2E shows front and back views of another representative example of an enhanced instant lottery ticket with printed video frames where the variable indicia are thematically related to the printed video frames from a different time period of the same example movie of the example tickets of FIGS. 2A thru 2D.
Figure 2F:
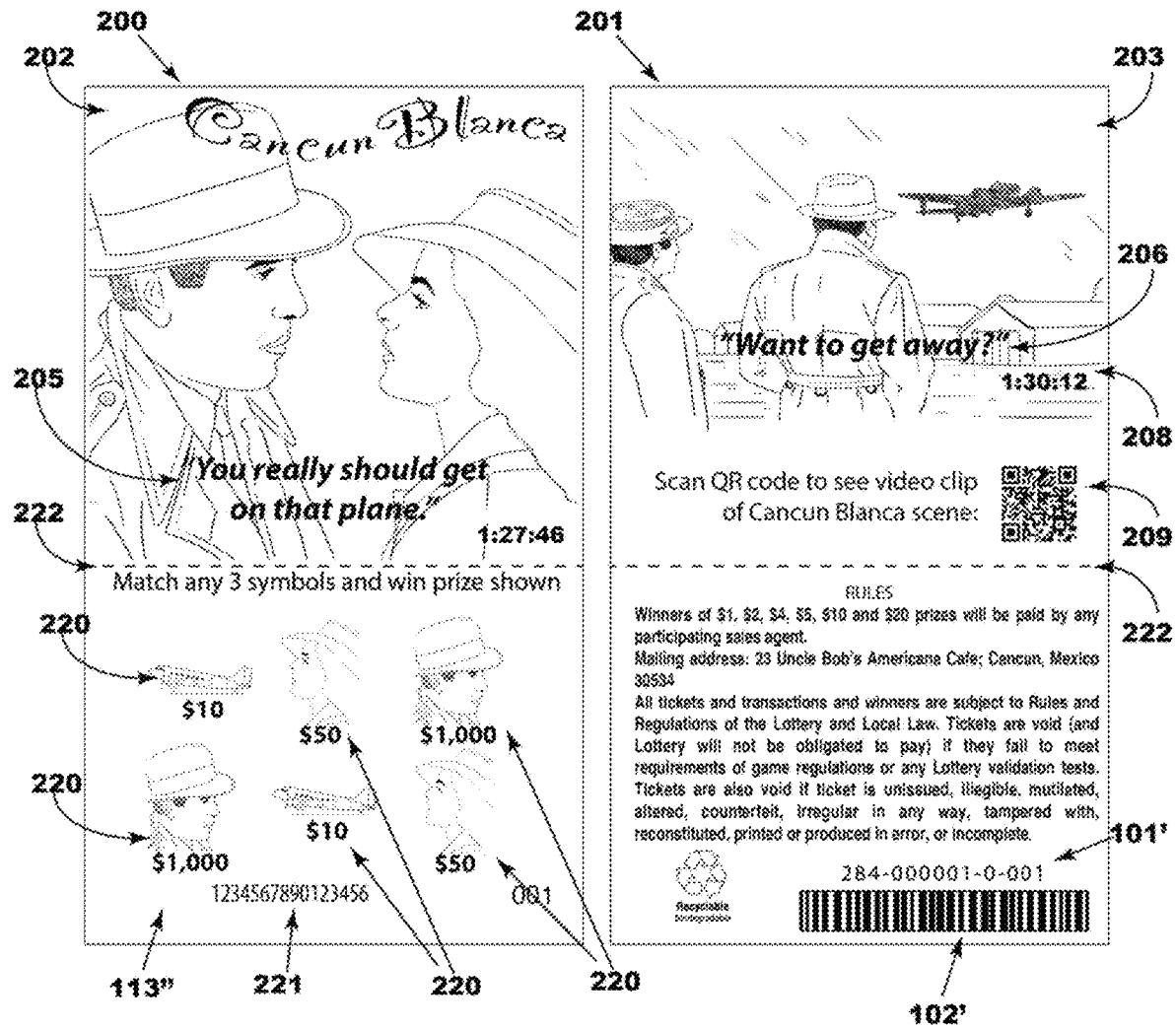
FIG. 2F shows front and back views of another representative example of the enhanced instant lottery ticket of FIGS. 2A thru 2D where the redemption portion is delineated from the display or collector portion by a perforation of the ticket.
Figure 3A:
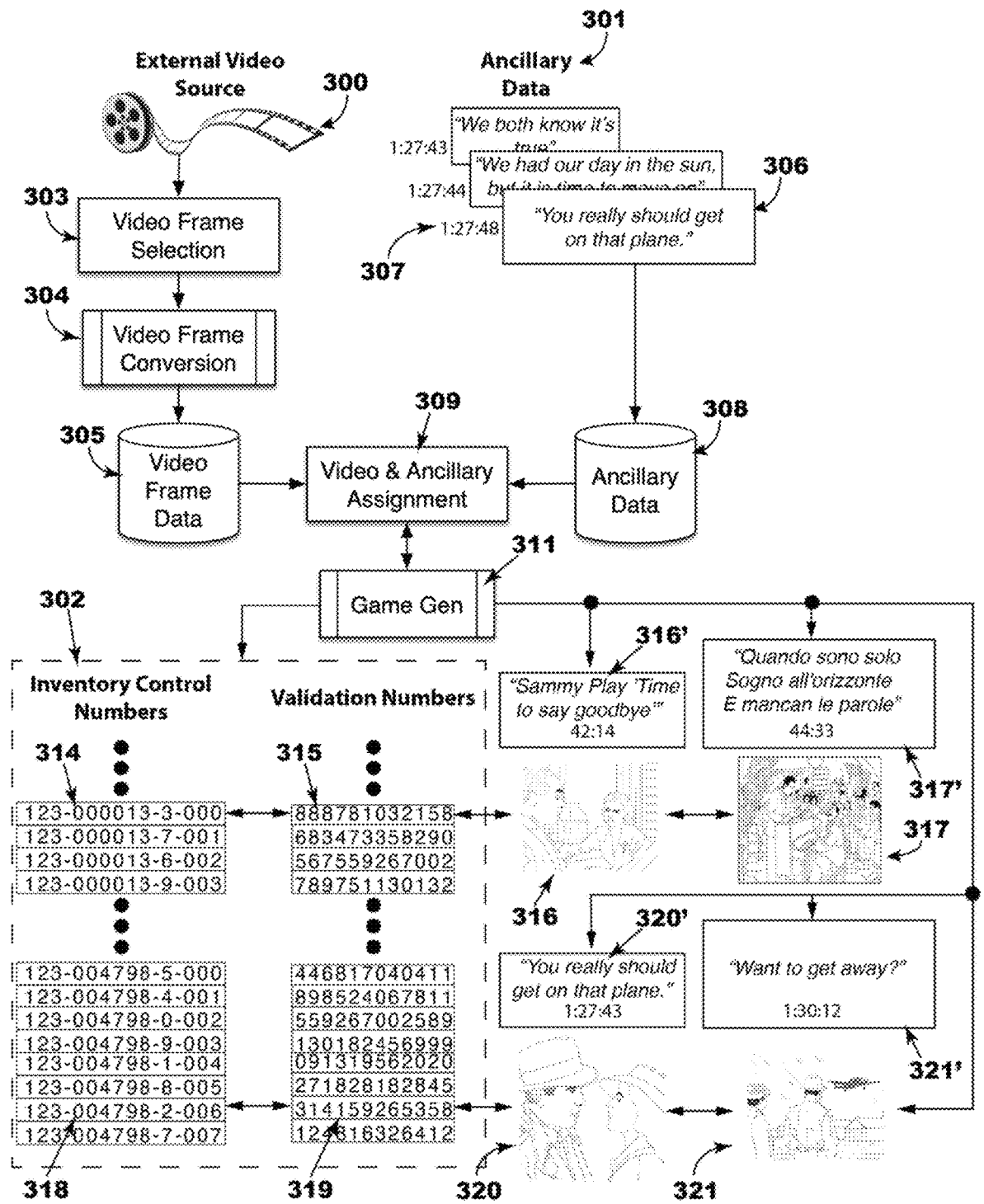
FIG. 3A is a block diagram of a representative example of a method of using a series of video frames from an external source and associated ancillary data logistically arranged and linked with respect to the game Gen used to create the tickets of FIGS. 2A thru 2D.

FIG. 3A illustrates a method and system for creating the example instant lottery tickets of FIGS. 2A thru 2F. This method includes accessing or obtain a video from an external video source 300 and converting it to separate and independent video frames that are temporarily stored in a database 305. Additionally, the method includes collecting or receiving ancillary data 301 from one or more of that external vide source 300 and/or a different source that can be synchronized or linked with the video frames (such as by elapsed time tags 307) and saved in the same database as the video frame data 305 (not shown in FIG. 3A) or a separate database 308. The video frames 305 and associated ancillary data 308 are associated with or assigned as indicated by 309 to a given inventory control number or validation number created by the Gen 311, such that specific video frame(s) and associated ancillary data are or can be flattened and printed on an instant lottery ticket or other document with other associated data (such as variable indicia).

More specifically, the method of FIG. 3A begins with selecting portions as indicated by 303 from an external video source 300 and digitizing the individual video frames as indicated by 304. These video frames can be converted to at least one format 304 that is compatible with an on-press Raster Image Processor ("RIP") such as Portable Network Graphics or "PNG", Joint Photographer's Expert Group or "JEPG", Tag Image File Format or "TIFF", etc. The exact selection of video frames from the external source 300 can vary with every video frame from the external source. In various embodiments, only a portion (such as without the movie credits or with every twenty-fourth video frame) of the entire external video source 300 will be selected and converted into video frames compatible with the on-press RIP. Regardless of the exact set of video frames selected, the resulting converted video frames are subsequently saved into a video frame database 305 such that each video frame is uniquely identified via separate data such as metadata (which can include for example, the chronological elapsed time of the video frame from the start, the quantity of the video frame from the start, etc).

In various embodiments, a second set of related ancillary data 301 from a source other than the external video source 300 is acquired and stored as ancillary data 308. The kind of ancillary data 301 can vary depending on the video source 300 but is related to the video source and consequently can include the inherent ability to be synchronized with the selected video frames 303 that were saved in the video database 305. In various embodiments, the synchronization between video frame data and ancillary data is accomplished via chronological elapsed time as indicated by 307 denoting when a given video frame appears from the beginning of the external video source 300. Thus, for example, at a standard frame rate of 24 fps, every frame could be time tagged with a timing resolution of 10 milliseconds (ms). In various embodiments, resolutions of one second can be adequate for most applications. It should be appreciated, that physically printing every frame at a resolution of 24 fps can create an appearance of redundant video frames on the tickets, since a majority of the video frames will display very little difference from one frame to another. The present disclosure contemplates other methods of identifying video frames and synchronizing those frames with ancillary data (such as sequential count of frames from start, movie reel changes, etc.) that can under some circumstances be more desirable. In various embodiments, a method can be established to uniquely identify each video frame and optionally synchronize each frame with associated ancillary data.

As previously stated, the type of ancillary data 301 can vary depending on the type of the external video source 300; however, the ancillary data 301 itself can be related to the external video source 300. Some non-limiting examples of ancillary data 301 are:

- printed dialog text occurring at the time of the selected video frame, plus-or-minus ("±") a short time period—e.g., ±3 seconds;
- the chronological time from start of the external video source 300 that the selected video frame occurred;
- the time period range of video frames that occur within a defined scene within the external video source 300;
- metadata describing such things as the location, the names of the characters, and/or a specific action occurring at the time of the selected video frame;
- additional printed dialog text not occurring around the time of the selected video frame—e.g., wrong answers from contestants of a quiz television show, scene description, commentary;
- portions of other video frames to be utilized in conjunction with the selected video frame; and
- artwork, isolated character images, or object images to be utilized in conjunction with the selected video frame.

In the exemplary method of FIG. 3A, the saved ancillary data 308 includes printed dialog text 306 synchronized with the external video source 300 by chronological time tags 307 with timing resolution of one second. In this example, in addition to providing synchronization with the video frame data 305, the chronological time tags 307 are also utilized as printed ancillary data (such as callouts 207 and 208 of FIG. 2B). Returning to FIG. 3A, once the video frame data 305 and the ancillary data 308 have been saved into the same or separate databases, a video and ancillary assignment process indicated by 309 synchronizes the previously asynchronous video frame data 305 and the ancillary data 308 via a common metadata metric or tag (such as elapsed chronological time from start of the selected video frame) thereby creating an unified reference for the game Gen 311 that can be readily adapted for composing and printing with instant ticket data. The game Gen 311 can include pseudorandomly assigning prize values (if any) to each ticket and create the unique inventory control and validation numbers 302 for each ticket. The outputs of the Gen 311 can be linked to a video frame from the video database 305 as well as optionally with ancillary data 308.

For example, inventory control number 314 and/or validation number 315 can be assigned or linked 309 to a set of video frames 316 and 317 as well as an associated set of ancillary data (such as dialog text and chronological time stamps 316' and 317') with the assigned video frames 316 and 317 and associated ancillary data 316' and 317' linked and ultimately flattened with the other ticket imaging data (such as variable indicia) associated with the inventory control number 314 and/or the validation number 315, for ultimately printing on a physical ticket or other document. Similarly, another inventory control number 318 and/or validation number 319 could be linked to a different set of video frames 320 and 321 and associated ancillary data 320' and 321' for printing a plurality of flattened images on the tickets.

In various embodiments, the exact arrangement of each video frame and associated optional ancillary data relative to the unique inventory control number and/or validation number can vary from one print run to another. For example, in one embodiment, every video frame from the external video source 300 can be printed on an instant ticket or other document arranged in chronological sequential time order with the inventory control numbers. In another embodiment, a courser time frame resolution of video frames and associated optional ancillary data can be selected (such as one video frame for every second) and arranged in chronological sequential time order. In another embodiment, the selected video frames and associated optional ancillary data can be assigned in a pseudorandom process relative to the inventory control numbers and/or the validation numbers with various time frame resolutions. In various embodiments, the selected video frames and associated ancillary data are not assigned relative to the prize value, to ensure the printed video frame and/or optional ancillary data do not provide a "tell" (as a security risk) for revealing the prize value of an instant ticket or other document without removing the SOC.

This is not to say that the printed selected video frame and/or ancillary data may not be a part of a game determining whether an instant ticket wins or loses a prize, but rather that the printed selected video frame and/or ancillary data that is visible on an unscratched ticket or other document should not in these embodiments provide any indication or any probability of winning or losing status without first removing the SOC. As a practical matter, the easiest and consequently most reliable method of ensuring that printed selected video frame and/or ancillary data do not provide any relationship to the ticket's value, is to provide a separate algorithm to determine ticket value independent of the video frame and/or ancillary data selection and assignment process.

Figure 2G:
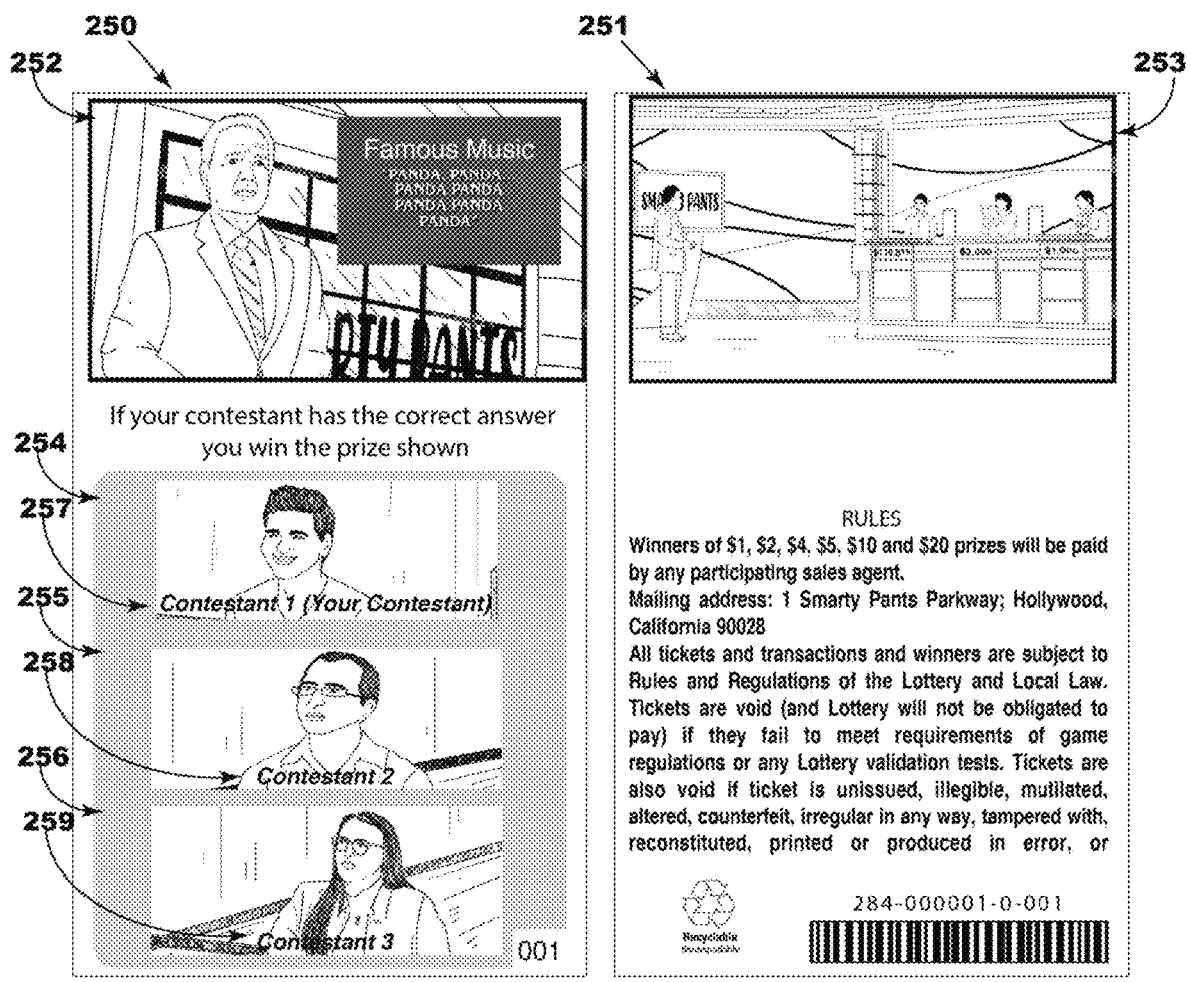
FIG. 2G shows front and back views of a representative example of an enhanced instant lottery ticket with printed video frames where a plurality of portions of the different related video frames from an example television quiz show are imaged in separate overprint regions on the ticket in addition to the front display and back portions.
Figure 2H:
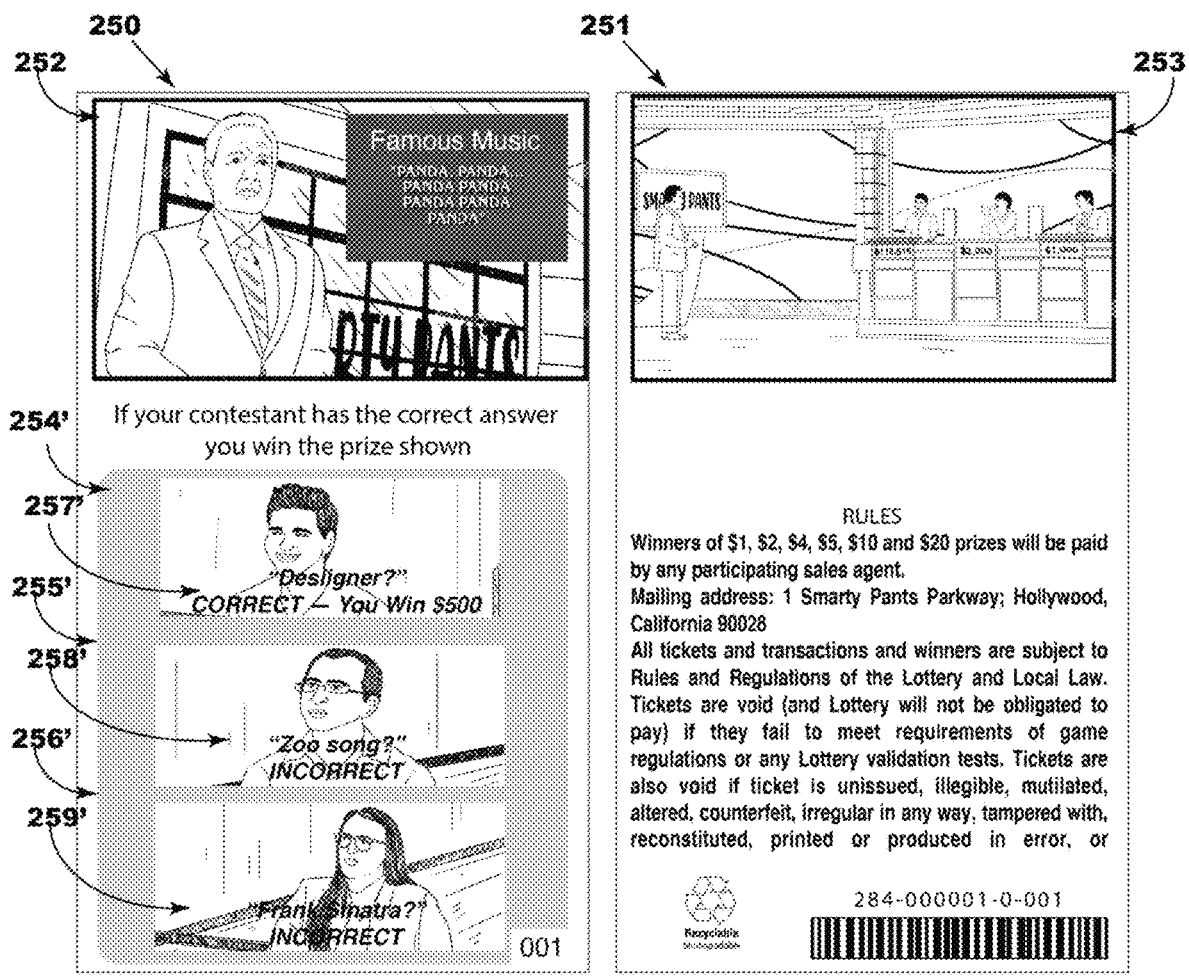
FIG. 2H shows front and back views of another representative example of the enhanced instant lottery ticket of FIG. 2G with printed video frames after the SOC is completely removed where a plurality of portions of the different related video frames are imaged under the SOC regions on the ticket.
Figure 3B:
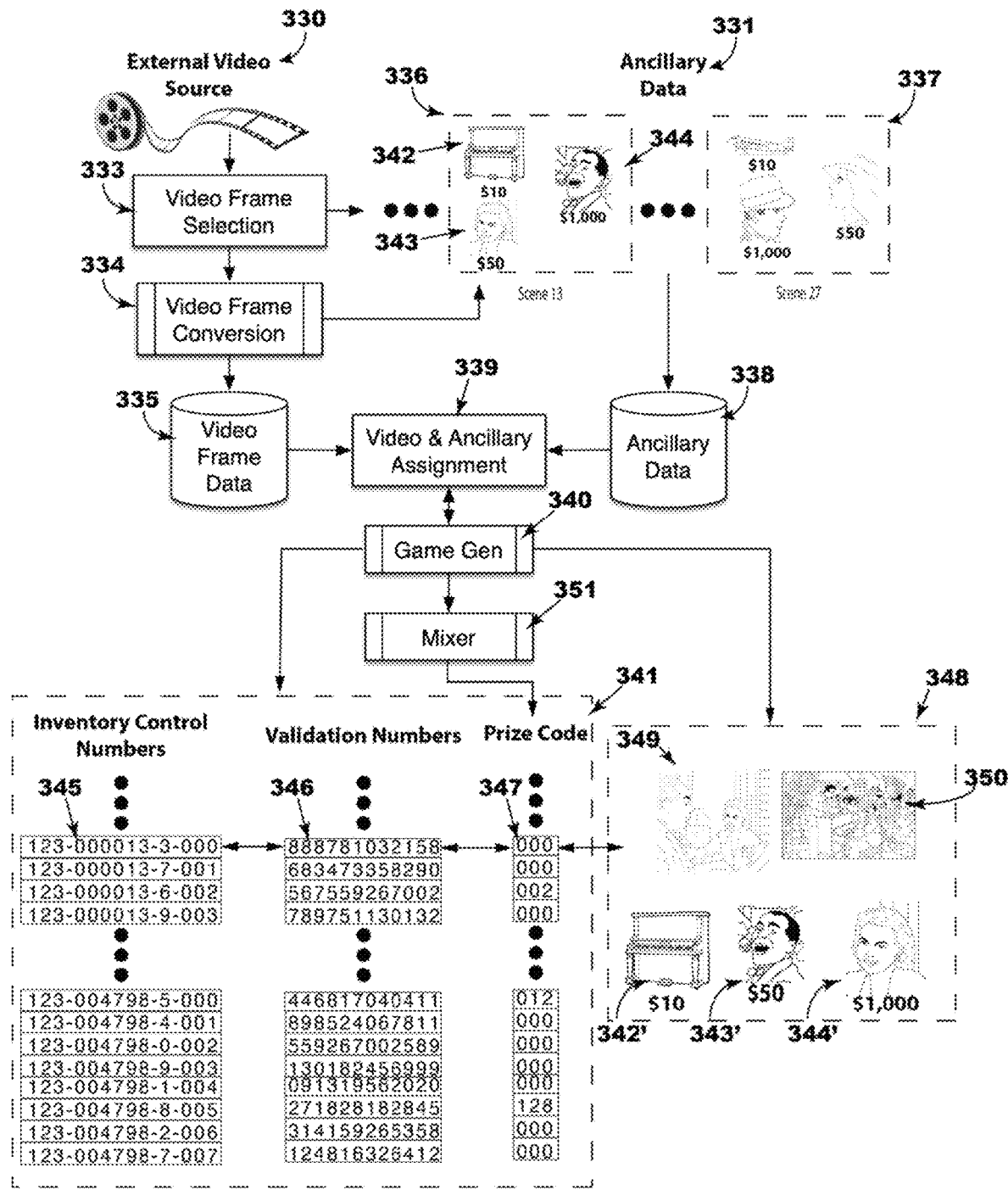
FIG. 3B is a block diagram of a representative example of a method of using a series of video frames from an external source and associated ancillary data where the variable indicia are thematically arranged and linked with respect to the scenes depicted in the video frames of the tickets of FIG. 2E.

For example, FIG. 3B illustrates a representative example of a series of video frames where the variable indicia are thematically arranged and linked with respect to the scenes depicted in the video frames of FIG. 2E. Like FIG. 3A, FIG. 3B starts with selected portions 333 from an external video source 330 being digitized and broken down into individual frames that are converted to at least one format 334 that is compatible with an on-press RIP and saved in a video frame database 335 such that each saved video frame is uniquely identified via separate metadata.

In the embodiment of FIG. 3B, a second set of related ancillary data 331 from a source other than the external video source 330 is also acquired and stored 338 in collections of scenes 336 and 337. The term "scene" refers to video frames that occur within a theoretical defined chronological time period that occurs within the external video source 330. Thus, in the embodiment of variable indicia being thematically related to the scenes 336 and 337 that are partially depicted in the video frames printed on the ticket (such as 202' and 203' of FIG. 2E), the set of variable indicia to be selected for one scene (such as 336 of FIG. 3B associated with the scene depicted in 202' and 203' of FIG. 2E) can be different than the set of variable indicia selected for another scene. Additionally, the time period defined for a scene can also define the acceptable range for multiple printed video frames on the same ticket or other document. In other words, the difference between the printed front video frame and the printed back video frame can be a predefined time period (such as fifteen seconds later in chronological time for the back video frame from the front video frame) so long as that predefined time period is within the same scene's predefined time period. Regardless of the usage, theoretical scenes can be stored in the ancillary database 338 or alternatively in the same database as the video frames 335 tagged with chronological time period metadata.

Once the video frame data 335 and the ancillary data 338 have been saved into the same or separate databases, a video and ancillary assignment process indicated by 339 can synchronize the previously asynchronous video frame data 335 and the ancillary data 338 thereby creating an unified reference for the game Gen 340 as well as the separate mixer 351 that assigns a value (such as a one byte) prize code to each validation number 341 that in turn drives the arrangement of variable indicia into a winning or losing pattern. In various embodiments, the outputs of the mixer 351 can be linked to video frames from the video database 335 as well as optionally with ancillary data 338.

For example, inventory control number 345 or validation number 346 can be assigned or linked 339 to a set of video frames 349 and 350. Additionally, the separate mixer 351 can generate a prize code 347 to be specifically associated with the previously generated validation number 346. After the mixer 351 has assigned a specific prize code 347 to the validation number 346, the assigned prize code 347 can then be algorithmically utilized to randomly or pseudorandomly select a series of variable indicia 342', 343', and 344' from the ancillary database 338 in a winning or losing pattern on the same ticket or other document as the separately assigned video frames 349 and 350. In other words, the pattern can be dependent on the assigned prize code 347 value. In this algorithmic process, the selected variable indicia 342', 343', and 344' can be from the set of variable indicia for the same scene 336 as the set of video frames 349 and 350 to be printed on the ticket 348. Accordingly, in certain embodiments, only the variable indicia (which is hidden under the SOC on unpurchased tickets) will be selected by the mixer 351 process produced prize code 347 in respect to the set of video frames that are not hidden under a SOC (and thus readily visible on unpurchased or played tickets) that were selected by the separate Gen process 340 that also generated the validation number 346 and the inventory control number 345 printed on the ticket 348 in accordance with the assignment process 339. Consequently, since the validation and inventory control numbers were generated by the independent Game Gen process 340 run at a previous time than the mixer 351 that assigns the prize code (or value) to the lottery ticket, the video frames 349 and 350 assigned to the validation number 346 and the variable indicia 342', 343', and 344' assigned from the prize code 347 are from discrete processes and therefore cannot be employed in determining the value of the ticket from the exposed video frames 349 and 350. More specifically, in various embodiments, even though the selected variable indicia 342', 343', and 344' hidden under the SOC and the exposed video frames 349 and 350 share a common scene, there is no legitimate method of determining an unscratched ticket's value from any analysis of the exposed video frames 349 and 350. Thus, even though the hidden variable indicia 342', 343', and 344' and exposed video frames 349 and 350 are thematically linked by a common scene, there is no link or "tell" established with the ticket's value on an unscratched ticket.

Ensuring that printed selected video frame and/or ancillary data does not provide any relationship to the ticket's value by providing a separate algorithm to determine ticket value independent of the video frame and/or ancillary data selection and assignment process is not necessarily the only possible method to ensure that produced tickets or documents do not contain "tells." It is also possible for video frame and/or ancillary data not covered by a SOC to be securely linked with variable indicia video frame and/or ancillary data covered by a SOC, by determining ticket value with a common process that establishes both the printed selected video frame and/or ancillary data and the variable indicia at the same time.

Figure 3C:
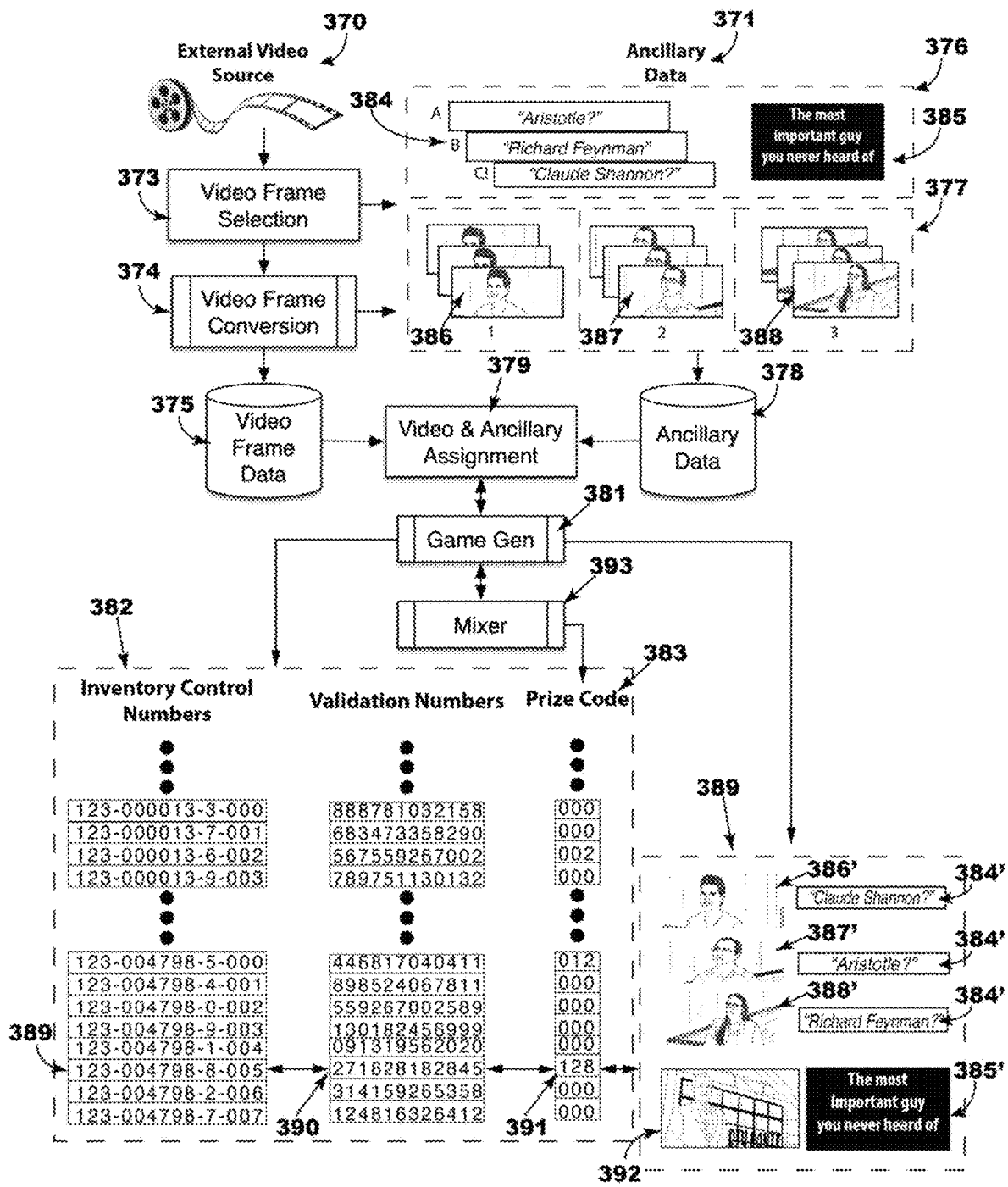
FIG. 3C is a block diagram of a representative example of a method of using a series of video frames from an external source and associated ancillary data including partial video frames to be incorporated as variable indicia as logistically arranged and linked with respect to the game Gen used to create the tickets of FIGS. 2G and 2H.

For example, FIG. 3C illustrates a series of video frames where the variable indicia are thematically arranged and linked with respect to the scenes depicted in the video frames of FIGS. 2G and 2H. Like the previous embodiments, FIG. 3C starts with selected portions 373 from an external video source 370 being digitized and broken down into individual and separate video frames that are converted to at least one format as indicated by 374 that is compatible with an on-press RIP and saved in a video frame database 375 such that each video frame is uniquely identified via separate metadata.

In this example embodiment, the associated ancillary data 371 is conceptually divided into pluralities of two distinct types of groups of data for a quiz show (e.g., the quiz show of FIGS. 2G and 2H) instant ticket game format—e.g., group 376 comprising the quiz show question 385 and answers 384 and group 377 comprising pluralities of portions of video frames of the three contestants 386, 387, and 388. Thus, the saved ancillary data 378 in this embodiment contains pluralities of at least two data types 376 and 377.

The question and answer group 376 is structured with paired questions 385 and answers 384 with, in this example, one question and three answers (such as two incorrect answers and one correct answer). In the example of FIG. 3C, the one correct answer is differentiated or flagged from the two incorrect answers with an explanation point "!" suffix (such as "C!") in its metadata. With this embodiment, there would be possibly one question and answer group for each unique ticket in the game with questions being saved as portions of video frames 385 from the external video source 370 and the answers 384 saved as ASCII (American Standard Code for Information Interchange), Unicode, or symbols rather than as video portions. Since, in this embodiment, answers 384 are utilized as game play variable indicia arranged on a ticket or document to assign value (if any) depending on the prize code 383 associated with the printed ticket, saving the answers 384 as text or symbols expedites variable indicia handling. In various embodiments, it may be desirable to provide answers as portions of video frames with the question also a video frame or text. Regardless of the formatting, the questions 385 and answers 384 can in certain embodiments be individually identified and grouped together 376 in the ancillary database 378 to ensure synchronization and facilitate automated placement on instant tickets or documents.

For the contestant group 377 in this example embodiment, the plurality of contestant partial video frames 386, 387, and 388 function as a thematic decorative for both the SOC overprint (such as printing on top of the SOC) as well as a background to the variable indicia under the SOC. Thus, the contestant partial video frames do not determine win or lose value of the ticket or other document and therefore can be selected independent of the questions and answers 376 as well as assigned 379 directly to an inventory control number 389 and/or validation number 390 by the Gen 381 before any value is imparted to the ticket or document 389 by the mixer 393 assigned prize code 391. The contestant partial video frames 386', 387', and 388' selected for the ticket or other document 389 may be the same for both the SOC overprint and the background for the variable indicia under the SOC resulting in a dissolve effect. Alternatively, the contestant partial video frames 386', 387', and 388' can differ between the SOC overprint and the variable indicia background so long as the same contestant is selected for both the SOC overprint and the variable indicia background from the same scene of partial video frames available for each contestant 386, 387, and 389.

As illustrated in the example of FIG. 2G, the SOC overprint contestant images 254, 255, and 256 provide a thematic and decorative background with the game play and consequently value determined by the overprint text 257, 258, and 259 designating which of the three contestants is "Your Contestant" 257. Thus, the overprint text 257, 258, and 259 is necessarily linked to the variable indicia and ticket or document value, since in this example only a correct answer from "Your Contestant" 257 will result in a winning prize. This becomes apparent in the related example of FIG. 2H, which depicts the FIG. 2G ticket with its SOC fully removed. As shown in FIG. 2H, the contestant images 254', 255', and 256' provide the thematic and decorative background for the prize determining variable indicia that comprises two incorrect answers 258' and 259' to the question posed in the display video frame 252 with the correct answer delegated to the variable indicia 257' of "Your Contestant" in this example. Thus, in this example, the contestant partial video frames are completely independent of prize value and consequently cannot convey any "tell" on the SOC overprint.

Returning to FIG. 3C, once the video frame data 375 and the ancillary data 378 have been saved into the same or separate databases, a video and ancillary assignment process indicted by 379 synchronizes the previously asynchronous video frame data 375 and the ancillary data 378 thereby creating an unified reference for the game Gen 381 as well as the separate mixer 393 that assigns a value prize code 391 to each validation number 390 which in turn drives the arrangement of game variable indicia into a winning or losing pattern. The output of the mixer 393 can be linked to partial video frame(s) 385' from the ancillary database 378 as well as a display image 392 from the video database 375 with the ancillary partial image 385' flattened onto the video database frame 392 creating a single composite imager file for the RIP.

As indicated above, an inventory control number 389 or validation number 390 can be assigned or linked to a set of video frames 392, 386', 387', and 388' by the Game Gen 381 or other process. Additionally, the separate mixer 393 generates a prize code to be specifically 391 assigned to a previously generated validation number 390. After the mixer 391 has assigned a specific prize code 391 to the validation number 390, the assigned prize code 391 can then algorithmically be utilized to select the correct arrangement of variable indicia 384' synchronized with the SOC overprint (not shown in FIG. 3C) from the ancillary database 378 in a winning or losing pattern.

Figure 4A:
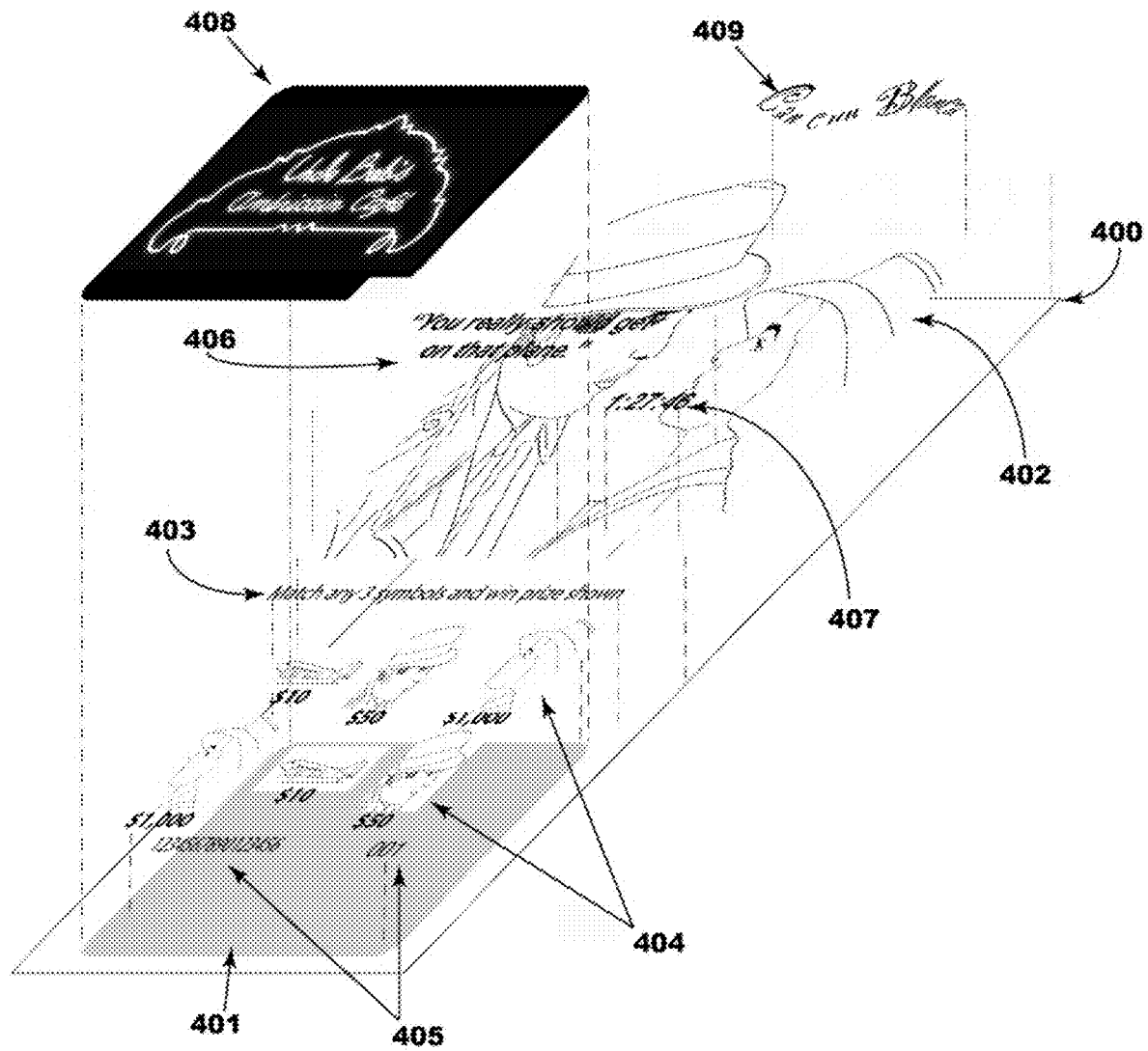
FIG. 4A is an exploded top perspective view of an example ticket such as a ticket of FIGS. 2A thru 2D illustrating both the printing plate applied layers as well as the video and variable indicia images to be flattened into a single graphic file in accordance with one embodiment of the present disclosure.
Figure 4B:
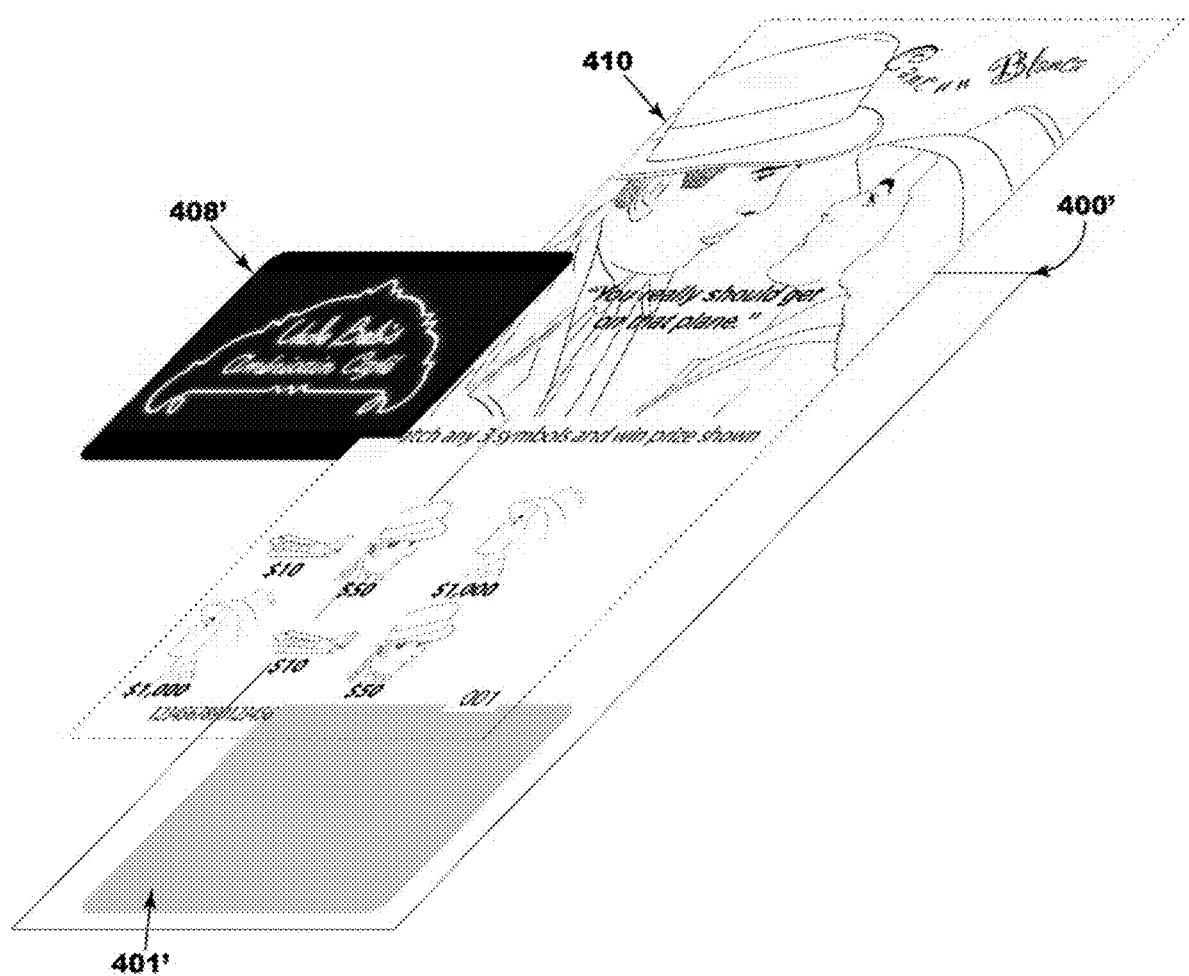
FIG. 4B is an exploded top perspective view of an example ticket of FIGS. 2A thru 2D illustrating both the printing plate applied layers with the single image graphic file flattened and imaged between the printing plate layers in accordance with another embodiment of the present disclosure.
Figure 6A:
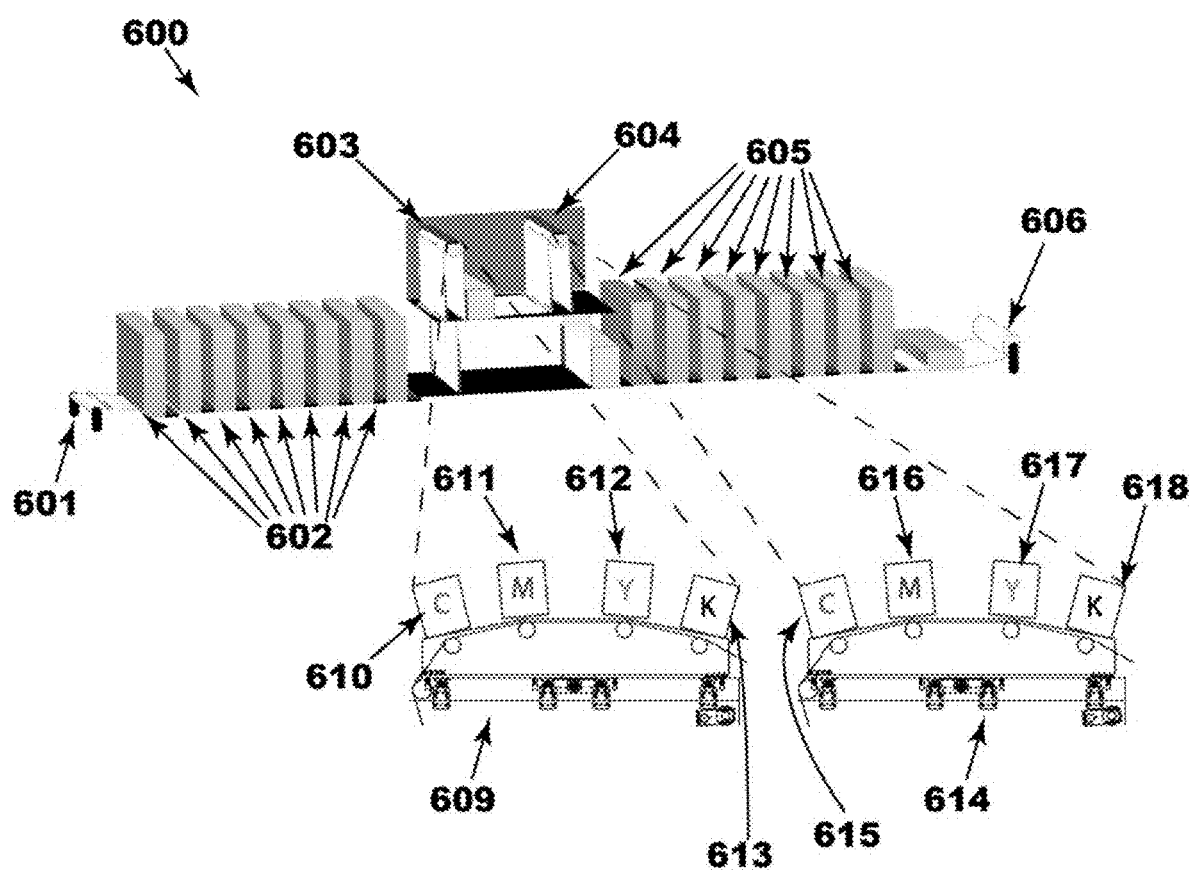
FIG. 6A is a schematic view of a representative example of a digital press configuration capable of printing the example modified scratch-off instant lottery tickets or documents of the present disclosure.

FIGS. 4A and 4B taken together show exploded views of the example tickets of FIGS. 2B, 2C, 2D, and 3B illustrating both printing plate applied ink film layers as well as the video, ancillary data, and game play variable indicia images. FIG. 4A illustrates the front of the ticket showing the digitally imaged display video frame 402, ancillary data 403, 406, 407, and 409, game play variable indicia 404, and validation and ticket numbers 405 all as discrete objects (prior to the flattening process). FIG. 4B illustrates the same printing plate applied ink layers and digitally imaged data as FIG. 4A with the discrete objects all flattened onto one homogeneous plane suitable for digital imaging of a scratch-off ticket or other document on a printing press such as shown in FIG. 6A.

FIG. 4A shows the ticket substrate 400 (such as a 10-point paper) flood coated with a primer (not shown in FIG. 4A) to ensure (1) better adhesion of the digital imaging to the surface, (2) increased digital image durability, and (3) reduced bleeding of the digital image ink into the paper substrate. The type and amount of primer applied to the substrate 400 can vary depending on the type of digital imager utilized. In the specific case of process color pigmented inkjet digital imagers (e.g., Memjet Duralink® imagers), the Michelman ink company's JetPrime® WB 1100 primer series applied at 3.6 BCM ("Billion Cubic Microns") functions as an acceptable primer for scratch-off ticket or document applications compatible with this disclosure. As shown in FIG. 4A, a series of lower security ink layers 401 are plate printed in the general area that will be under the SOC and on top of the substrate 400 and flood coated primer. These lower security layers are meant to provide chemical barriers protecting the variable indicia from diffusion, fluorescence, electrostatic, and other known attacks and the lower security-ink film layers provide opacity and diffusion barriers as well as a higher contrast (e.g., white or gray) background such that a human consumer can read the variable indicia 104". The same or similar lower security ink film layers can comprise the same or similar configuration of the lower security ink film stack 401 (FIG. 4A) of this present disclosure with the addition of a primer layer on top of the lower security stack that is similar to the primer layer previously explained for the substrate 400.

The variable indicia 404 as well as the validation and (optionally) the ticket number 405 are applied on top of the lower security layers 401 to ensure protection from known attacks through the back of the ticket substrate 400. The plurality of other digital imaging 402, 403, 406, 407, and 409 that are not covered by SOC are imaged directly on the substrate 400 primer since there are no security requirements for the display portion which is intentionally visible on unpurchased and unscratched tickets. The remaining scratch-off and overprint ink film layers 408 are applied by plate printing on top of the variable indicia 404 and lower security ink film layers 401. Like the lower security ink film stack, these upper security and decorative layers are meant to isolate and protect the variable indicia 404.

The same substrate and primer 400' as well as security ink film stacks 401' and 408' are illustrated in FIG. 4B with all of the discrete objects flattened onto one homogeneous virtual plane 410 suitable for a one pass digital imaging of the scratch-off ticket or other document. After the digitally imaged display video frame 402 (FIG. 4A), ancillary data 403, 406, 407, and 409, variable indicia 404, and validation and ticket numbers 405 data are selected for a given ticket, a grouping process can pair the separate data objects ensuring that all files are associated with the same book and ticket number (see callout 410 of FIG. 4B). Once this grouping process is completed, the resultant merged ticket front (including the display and secure variable indicia) and the back (including the static back and variable indicia back—not shown in FIG. 4B) pairs are flattened resulting in merged and flattened homogeneous files representing the imaging data 410 for one ticket's front. Thus, by flattening the plurality of discrete imaging data files into one homogeneous plane file 410, each side of a ticket can be printed with one pass through a digital imager (see callout 609 for the front and callout 614 for the back, both of FIG. 6A).

Figure 4C:
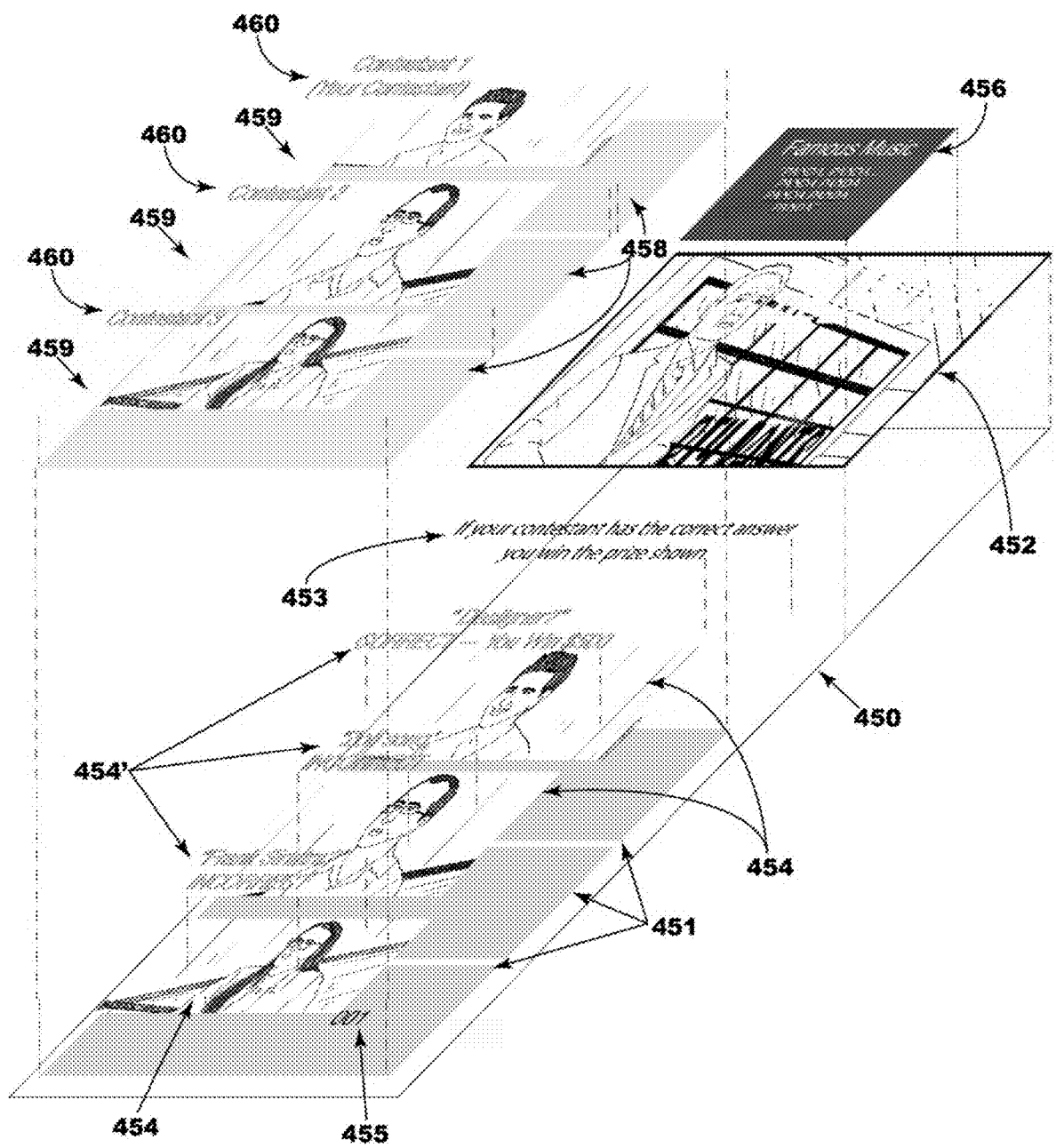
FIG. 4C is an exploded top perspective view of an example ticket of FIGS. 2G and 2H illustrating both the printing plate applied layers as well as the video and variable indicia images to be flattened into a single graphic file in accordance with one embodiment of the present disclosure.
Figure 4D:
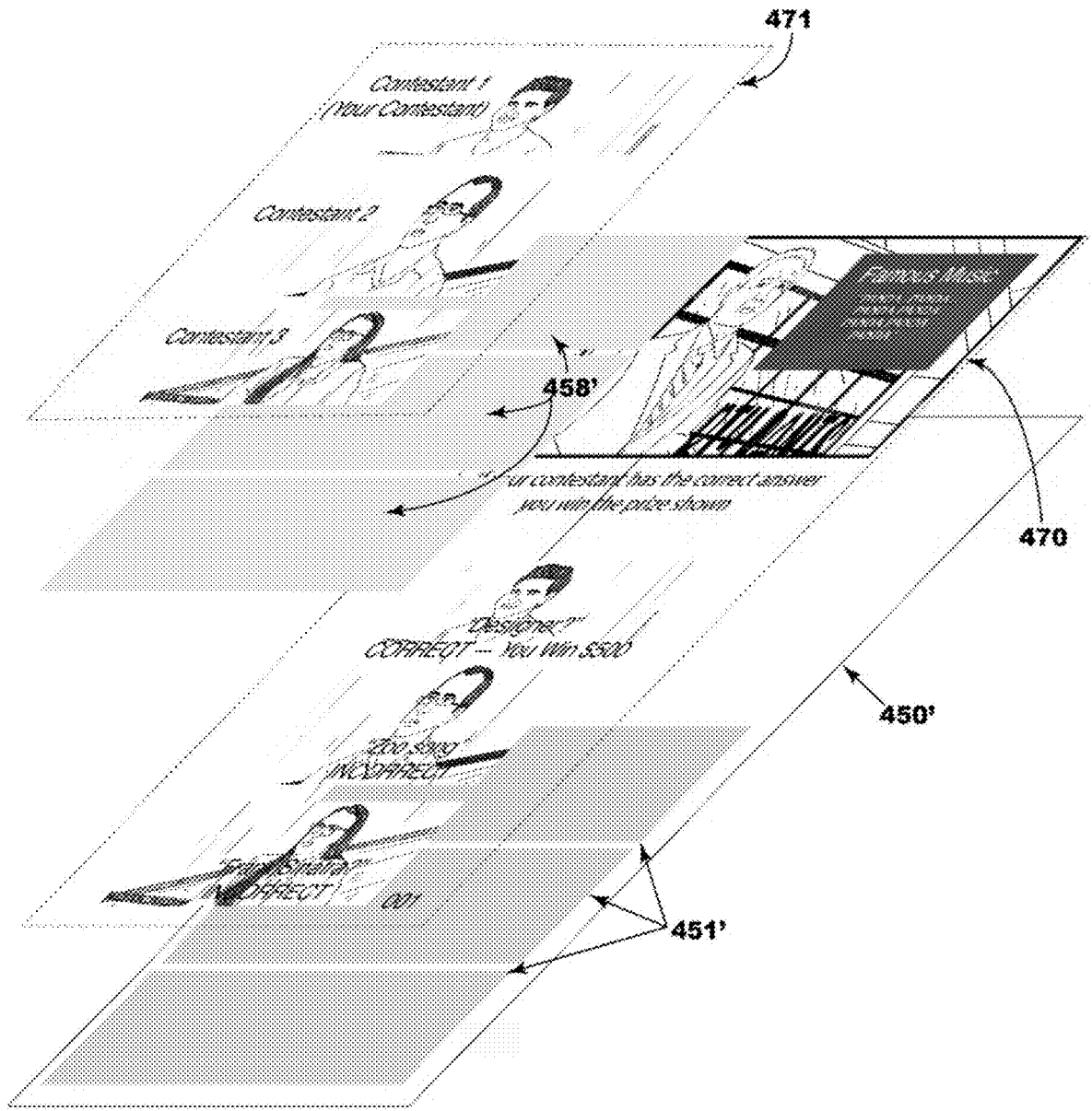
FIG. 4D is an exploded top perspective view of an example ticket of FIG. 4C illustrating both the printing plate applied layers with the one image graphic file flattened and imaged between the printing plate layers and the other image graphic file flattened and imaged on top of the SOC as an overprint in accordance with one embodiment of the present disclosure.
Figure 6B:
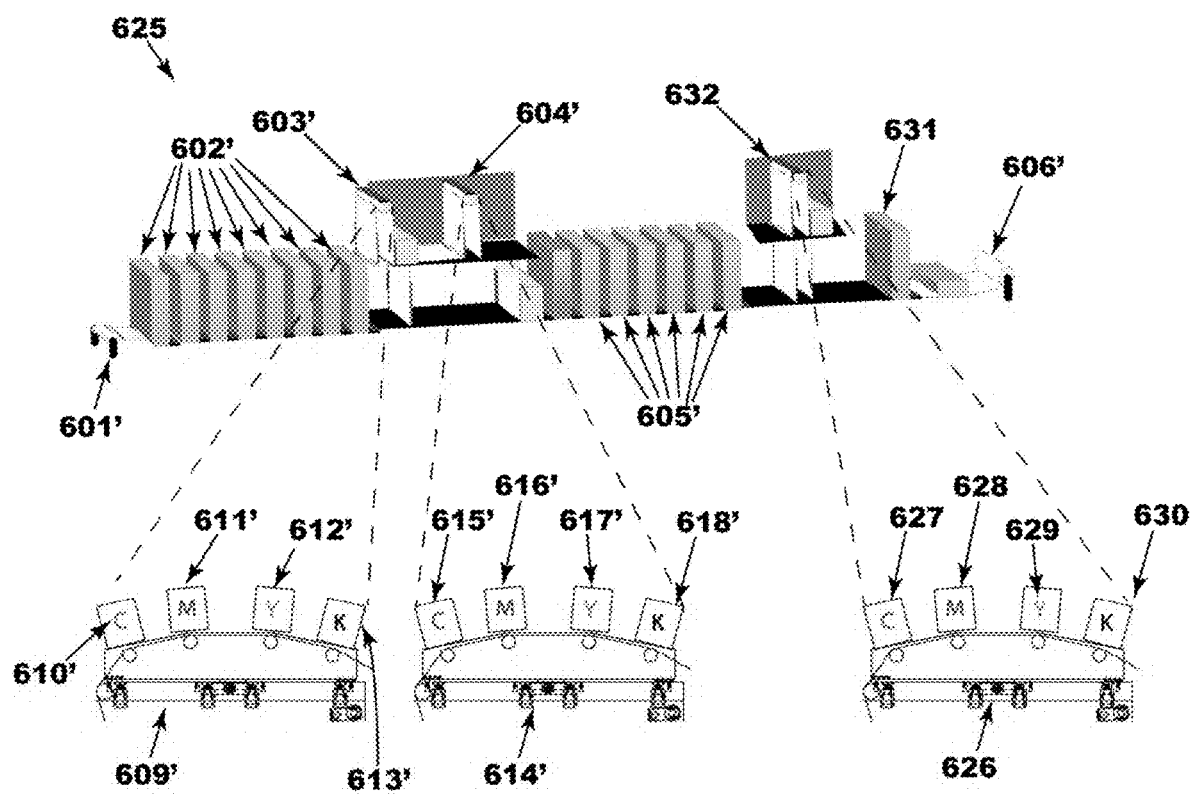
FIG. 6B is a schematic view of another representative example of a digital press configuration capable of printing the modified scratch-off instant lottery tickets or documents of the present disclosure.

FIGS. 4C and 4D taken together show exploded views of the example tickets of FIGS. 2G, 2H, and 3C illustrating both printing plate applied ink film layers 451 and 458 as well as the video, ancillary data, and variable indicia images. As explained above, FIG. 4C illustrates the front of the ticket detailing the display video frame 452, ancillary data 453 and 456, variable indicia 454 and 454', and ticket number 455 all as discrete objects. FIG. 4C also includes second front pass digital imaging files 459 and 460 for printing on top of the SOC as an Overprint ("OP"). FIG. 4D illustrates the same printing plate applied ink layers 451' and 458' and digitally imaged data as FIG. 4C with the discrete objects flattened onto two homogeneous planes 470 and 471 suitable for digital imaging of scratch-off tickets or other documents on a printing press such as shown in FIG. 6B.

Returning to FIG. 4C, as indicated above, the ticket substrate 450 can be flood coated with a transparent primer (not shown in FIG. 4C), and a series of lower security ink layers 451 are plate printed in the general area that will be under the SOC and on top of the substrate 450 and flood coated primer. The game play variable indicia 454 and 454' as well as the validation and ticket number 455 can be applied on top of the lower security layers 451 to ensure protection from known attacks through the back of the substrate 450. The plurality of other digital display imaging 452, 453, and 456 that are not covered by SOC are imaged directly on the substrate 450 primer since there are no security requirements for the display portion that are visible (on purpose) on unpurchased and unscratched tickets. The scratch-off ink film security layers 458 are applied by plate printing on top of the game play variable indicia 454 and 454' and lower security ink film layers 451. Like the lower security ink film stack, these upper security layers are meant to isolate and protect the game play variable indicia 454 and 454'. FIG. 4C includes a second Overprint or "OP" digital image portion 459 and 460 that is printed on top of the SOC. As illustrated in FIG. 4C, contestant partial video frames selected for the ticket or document 389 can be the same for both the SOC overprint 459 and the background for the variable indicia 454 under the SOC resulting in a dissolve effect. In the embodiment of FIG. 4C, the partial video frames of the game play variable indicia 454 and the OP 459 include another layer of textual data 454' and 460, respectively, that denote the winning and losing game play variable indicia by, in this example, identifying "Your Contestant" on the OP and the corresponding "CORRECT" or "INCORRECT" answers on the variable indicia. Thus, in the example of FIG. 4C, the OP text 460 is synchronized to the underlying variable indicia 454 without providing a "tell" indication of a ticket's winning or losing status without removing the SOC.

The same substrate and primer 450' as well as security ink film stacks 451' and 458' are illustrated in FIG. 4D with all of the discrete digitally imaged objects flattened onto two homogeneous virtual planes 470 (display and game play variable indicia) and 471 (OP). As explained above, a flattening process results in merged and flattened files representing all the imaging data 470 and 471 for the ticket's front side. Thus, by flattening the plurality of discrete objects onto two homogeneous plane files 470 and 471, the ticket front can be printed with one pass through two sets of digital imagers (see callout 609' for the display and variable indicia and callout 626 for the OP in FIG. 6B).

Figure 5A:
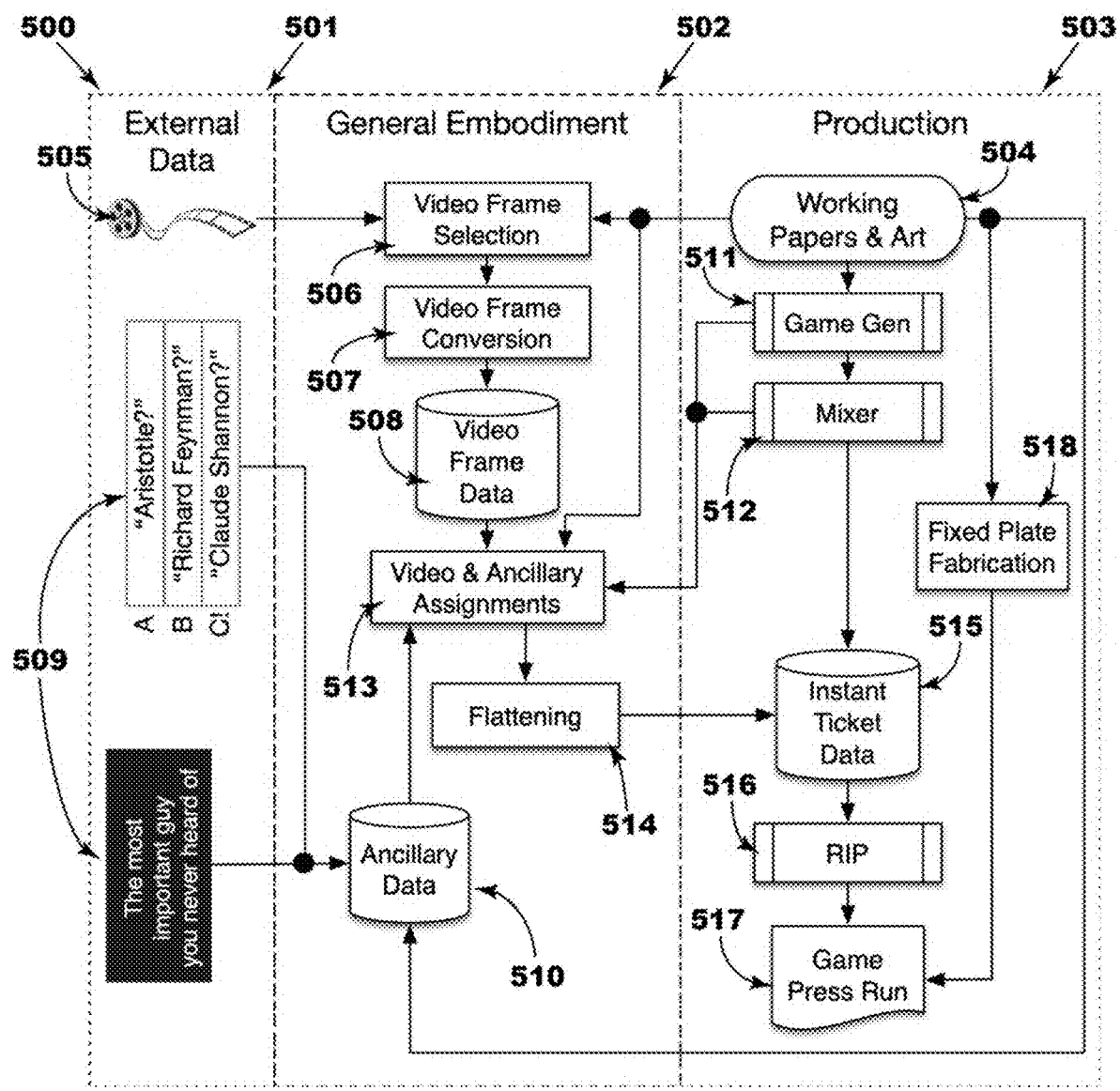
FIG. 5A is a flowchart providing a schematic graphical overview of a method for making the tickets of FIGS. 2G and 2H as well as 3C for digitally imaging video frames on the tickets.
Figure 5B:
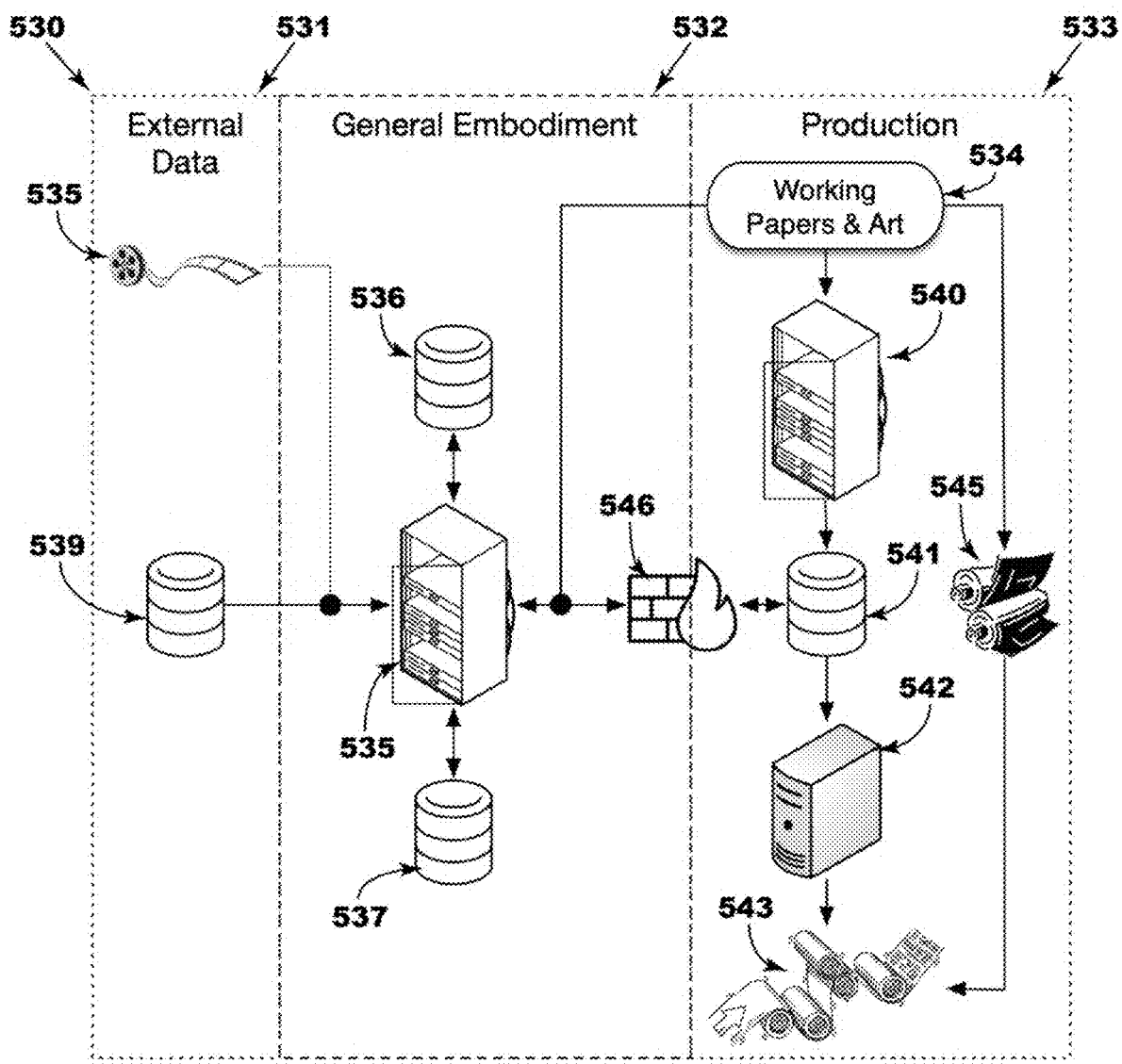
FIG. 5B is a schematic view of an example representative high level hardware architecture diagram of certain components associated with the example system representative block diagrams of FIG. 5A.

FIGS. 5A and 5B, taken together, show example embodiments of the embedding and printing video frame systems for various different types of exemplary instant tickets (such as the example tickets of FIGS. 2A thru 2H) utilized for lottery gaming. FIG. 5A illustrates an embodiment that can be used for the example tickets of FIGS. 2A thru 2H and 3A thru 3C and specifically for digitally imaging video frames on instant tickets. FIG. 5B illustrates the key components associated with the system representative block diagram of FIG. 5A.

System 500 and 530 of FIGS. 5A and 5B is conceptually divided into three cognizant groupings including "External Data" 501/531, "General Embodiment" 502/532, and "Production" 503/533 by the three columns as shown in FIGS. 5A and 5B. If a particular flowchart function appears completely within a column, its functionality is limited to the data category of the associated column—e.g., Ancillary Data 510/537 is exclusively part of the General Embodiment grouping 502/532.

FIG. 5A illustrates the system 500 in a flowchart format with game generation functionality shown in the "Production" column 503 along with the "External Data" column 501 comprising the visual data supplied by sources that are not part of a known instant ticket generation process. Finally, the "General Embodiment" column 502 displays the functionality exclusive to the present disclosure.

As shown for the system 500 of FIG. 5A, the video frame data enhanced instant ticket production starts with generation of working papers 504 (such as the contract between the lottery and instant ticket provider as well as possibly video frame copyright owners) describing the technical details of the instant tickets to be printed as well as associated non-video frame (such as security ink film plates) artwork. The executed working papers 504 are then used to specify Game Generation 511 programming (such as the digital indicia imaging of instant tickets ultimately resulting in ticket winning and losing distribution) as well as the manufacture of any static printing plates 518 (e.g., Flexographic, Gravure) used primarily to print the security ink film layers of the instant tickets. After Game Generation 511 is completed, a separate Mixer process 512 effectively assigns prize codes (e.g., callout 383 of FIG. 3C) to the validation numbers associated with separate inventory control numbers (e.g., callout 382 of FIG. 3C) ultimately generating an imager file 515 (FIG. 5A) for on-press digital imaging as well as the foundations of the digital validation and ship files (e.g., FIG. 1C callouts 128 and 127, respectively). The generated Instant Ticket Data 515 (FIG. 5A) is stored encrypted as ciphertext in a database.

At this point, the additional processing 502 enabled by the present disclosure 500 is added to the instant ticket production process 503. First, based on the specifications defined in the Working Papers 504, a series of video frames garnered from an external video source 505 are selected 506 for digital imaging on behalf of the pending Game Press Run 517 via the Video Frame Selection process 506 that is automatically executed by digital algorithms based on rules as defined by the Working Papers 504—e.g., every sixtieth video frame, beginning with video running time X and ending with video running time Y. Regardless of the Video Frame Selection process 506 utilized, the selected individual video frames are then converted to at least one format (e.g., Portable Network Graphics or "PNG", Joint Photographer's Expert Group or "JEPG", Tag Image File Format or "TIFF", Portable Data Format or "PDF") that is compatible with the on-press RIP 516 with the converted individual frames saved in a Video Frame Database 508 each video frame with its own unique metadata tag—e.g., elapsed time from the beginning of the video that the selected frame appeared, number of video frames from the beginning of the video, etc.

Next, ancillary data (e.g., video dialog, quiz show questions, elapsed time) 509 are saved in an Ancillary Database 510 that may or may not be part of the Video Frame Database 508. Each Ancillary Database 510 entry includes its own individual metadata tag such that each ancillary data entry can be uniquely identified and coordinated with its associated garnered video frame(s). As before, the ancillary data 509 garnered will be defined by the Working Papers specification 504.

After the Video Frame 508 and Ancillary Data 510 database(s) are loaded with video frames and associated ancillary data as specified by the Working Papers 504, the video frame 508 and associated ancillary data 510 are identified by their metadata and dispensed by the Video & Ancillary Assignments process 513 to the virtual individual tickets created during the Game Gen process 511. For example, the FIG. 3A inventory control number 314 and/or validation number 315 may be assigned or linked 309 to a set of video frames (316 and 317) as well as an associated set of ancillary data (such as the dialog text and chronological time stamps 316' and 317') with the assigned or linked video frame(s) (316 and 317) and associated ancillary data (316' and 317') linked with the other ticket data (e.g., game play variable indicia) associated with the inventory control number 314 and/or the validation number 315 to be printed on the same physical ticket or document. Similarly, another inventory control number 318 and/or validation number 319 can be linked to a different set of video frame(s) (320 and 321) and associated ancillary data (320' and 321') with the ultimate goal being to print a plurality of tickets or documents with varying appearance by utilizing a plurality of video frames and/or ancillary data selected from External Data sources 501 (FIG. 5A).

The exact arrangement of each video frame and associated optional ancillary data relative to the unique inventory control number and/or validation number can vary from one print run to another. For example, in one embodiment, every video frame from the external video source 300 (FIG. 3A) could be printed on an instant ticket or document arranged in chronological sequential time order with the inventory control numbers. In another embodiment, a courser time frame resolution of video frames and associated optional ancillary data can be selected (e.g., one video frame for every second) arranged in chronological sequential time order. In another embodiment, the selected video frames and associated optional ancillary data can be assigned in a pseudorandom process relative to the inventory control numbers with various time frame resolutions. However, the selected video frames and associated ancillary data should not be assigned relative to the prize value, since that type of assignment could inherently include the risk of the printed video frame and/or optional ancillary data providing a "tell" or security risk for revealing the prize value of an instant ticket or document without removing the SOC.

This is not to say that the printed selected video frame and/or ancillary data cannot be a part of a game where it determines whether an instant ticket wins or loses a prize, only that the printed selected video frame and/or ancillary data that is visible must not provide any indication or "tell" of winning or losing status for a given unplayed ticket when the printed selected video frame and/or ancillary data is visible without removing the SOC. As a practical matter, the easiest and consequently most reliable method of ensuring that printed selected video frame and/or ancillary data do not provide any relationship to the ticket's value, is to provide a separate algorithm to determine ticket value independent of the video frame and/or ancillary data selection and assignment process. Consequently, in the general embodiment 500 of FIG. 5A, the Video & Ancillary Assignments 513 for display and (optionally) the ticket back and/or overprint are typically assigned at the output of the Game Gen process 511 before the Mixer process 512 that essentially assigns any value (i.e., prizes) to each ticket.

For example, FIG. 3B illustrates a block diagram of a representative example of a series of video frames where the game play variable indicia are thematically arranged and linked with respect to the scenes depicted in the video frames of FIGS. 2D and 2E. Like FIG. 3A, FIG. 3B starts with selected portions 333 from an external video source 330 being digitized and broken down into individual frames that are converted to at least one format 334 that is compatible with an on-press RIP and saved in a video frame database 335 such that each video frame is uniquely identified via separate metadata. However, in the embodiment of FIG. 3B, a second set of related ancillary data 331 from a source other than the external video source 330 is also acquired and stored 338 in collections of scenes (336 and 337). Thus, in a specific embodiment of game play, variable indicia are thematically related to the scene that are partially depicted in the video frame(s) printed on the ticket (e.g., 205 and 206 of FIG. 2D and 202' and 203' of FIG. 2E), the set of game play variable indicia to be selected for one scene (e.g., 336 of FIG. 3B associated with the scene depicted in 202' and 203' of FIG. 2E) may be different than the set of game play variable indicia selected for another scene (e.g., 337 of FIG. 3B associated with the scene depicted in 205 and 206 of FIG. 2D).

Returning to FIG. 5A, once the video frame data 508 and the ancillary data 510 have been saved into the same or separate databases, the Video & Ancillary Assignments process 513 synchronizes the previously asynchronous Video Frame Data 508 and the Ancillary Data 510, thereby creating an unified reference for the Game Gen process 511 as well as the separate Mixer process 512 that assigns a value prize code to each validation number that in turn drives the arrangement of variable indicia into a winning or losing pattern. The outputs of the Mixer process 512 can be linked to video frames from the Video Frame database 508 as well as optionally with Ancillary Data 510 for utilization as game play variable indicia.

For example, an inventory control number 345 (FIG. 3B) or validation number 346 can be assigned or linked 513 (FIG. 5A) to a set of video frames (callouts 349 and 350 of FIG. 3B). Additionally, the separate Mixer process 512 (FIG. 5A) generates a prize code 347 (FIG. 3B) to be specifically associated with a previously generated validation number 346. After the Mixer process 512 (FIG. 5A) has assigned a specific prize code 347 (FIG. 3B) to the validation number 346, the assigned prize code 347 can then algorithmically be utilized to randomly or pseudo-randomly select a series of game play variable indicia (342', 343', and 344') from the ancillary database 338 in a winning or losing pattern. In other words, the pattern is dependent on the assigned prize code 347 value. In this algorithmic process 513 (FIG. 5A), the selected game play variable indicia would be from the set of game play variable indicia for the same scene 336 (FIG. 3B) as the set of video frames (349 and 350) printed on the ticket 348. Accordingly, only the game play variable indicia (which is hidden under the SOC on unpurchased tickets) will be selected by the mixer process produced 351 prize code 347 with the set of video frames that are not hidden under a SOC (i.e., readily visible on unpurchased or played tickets) selected by the separate Gen process 511 (FIG. 5A) that generated the validation number 346 (FIG. 3B) printed with the inventory control number 345 on the ticket 348 in accordance with the Video & Ancillary Assignments process 513 (FIG. 5A). Consequently, since the validation and inventory control numbers were generated by independent processes 340 (FIG. 3B) run at a previous time than the Mixer process 512 (FIG. 5A) that assigns the prize code (i.e., value) to each ticket, the video frames (349 and 350 of FIG. 3B) assigned to the validation number 346 and the game play variable indicia (342', 343', and 344') assigned from the prize code 347 are from discrete processes and therefore cannot be employed in determining the value of the ticket from the exposed video frames (349 and 350). More to the point, even though the selected game play variable indicia (342', 343', and 344') hidden under the SOC and the exposed video frames (349 and 350) share a common scene, there will be no possibility of determining an unscratched ticket's value from any analysis of the exposed video frames (349 and 350). Thus, even though the hidden game play variable indicia (342', 343', and 344') and exposed video frames (349 and 350) are thematically linked by a common scene, there is no link or "tell" established with the ticket's value on an unscratched ticket.

Ensuring that printed selected video frame and/or ancillary data does not correlate any relationship to the ticket's value by providing a separate algorithm to determine ticket value independent of the video frame and/or ancillary data selection and assignment process is not necessarily the only method to safeguard secure produced tickets against "tells." It is also possible for video frame and/or ancillary data to be securely assigned 513 (FIG. 5A), thereby determining ticket value with a common process that establishes both the printed selected video frame and/or ancillary data and the variable indicia at the same time.

After the digitally imaged Video Frame Data 508 (FIG. 5A) and Ancillary Data 510 have been assigned 513 to a given ticket, a Flattening process 514 enabled by this disclosure essentially combines the separate Video Frame Data 508 and Ancillary Data 510 such that each flattened data layer becomes a homogeneous plane that can be readily printed with one pass through a digital imager—e.g., callout 603 for the front imager and callout 604 for the back imager, both of FIG. 6A; or callouts 603', 604' and 632 of FIG. 6B for the front imager, back imager, and overprint imager, respectively. Thus, by Flattening 514 (FIG. 5A) pluralities of discrete imaging data files onto homogeneous plane files (e.g., callout 410 of FIG. 4B, callouts 470 and 471 of FIG. 4D) the discrete imaging data is combined into a background layer for simplicity of RIP processing 516 (FIG. 5A) as well as reduction of file size. Once the flattened homogeneous plane files are processed 514, the resulting image data is saved by ticket inventory control number with any other associated image data in the Instant Ticket database 515 for printing when needed.

Finally, when printed tickets or document are required, the Instant Ticket database 515 imaging data is optionally decrypted and downloaded to the RIP 516 for the physical printing of the Game Press Run 517. Prior to starting the Game Press Run 517, any required fabricated static plates 518 (e.g., upper 408' and 458' layers as well as lower 401' and 451 layers of FIGS. 4B and 4D, respectively) are mounted on the press with each plate in its own individual printing station (e.g., 602 and 605 of FIG. 6A). After completion of the Game Press Run 517 the physical tickets or documents as well as the associated ship and validation files are sent to the lottery or other cognizant authority for distribution, sales, and validation.

FIG. 5B illustrates the hardware architecture diagram 530 of the various components associated with the system representative block diagram of FIG. 5A. As shown in the hardware architecture diagram 530 of FIG. 5B, the video frame data enhanced instant ticket production starts with generation of working papers and associated artwork 534 specifying the details for the tickets or documents to be printed. Among other things, the executed working papers 534 stipulate Game Generation 511 programming (FIG. 5A), the manufacture of any static printing plates 545 (FIG. 5B), as well as the video frames 535 and ancillary data 539 to be garnered.

At this point, the additional processing 532 enabled by the present disclosure 530 is added to the traditional instant ticket production process 533. First, based on the specifications defined in the Working Papers 534, a series of video frames garnered from an external video source 535 are selected, converted to at least one format compatible with the on-press RIP 542, and saved 536 by previously disclosed processes preferably running on server 535 that are separate from the normal prior art system Gen and mixer server(s) 540. A separate physical server 535 for the video frame and ancillary data processing enabled by this disclosure can be employed, since the physically separate server 535 simplifies integration to the Gen server 540 with predefined protocols established to a shared non-volatile memory imager database 541. In this embodiment, the link between the disclosed server 535 and the shared non-volatile memory database 541 and or Gen server 540 is via a designated portal through a separate firewall 546. This designated portal can be a point-to-point Virtual Private Network (VPN) with some sort of authentication protocol (e.g., Challenge-Handshake Authentication Protocol or "Chap", Extensible Authentication Protocol or "EAP", etc.) between server 535 and the firewall 546 and/or the prior art Gen server 540.

Next, ancillary data 539 is saved by server 535 in an ancillary database 537 that may or may not be part of the video frame database 536. Like the video database 536, each ancillary database 537 entry includes its own individual metadata tag such that each ancillary data entry can be uniquely identified and optionally coordinated with its associated garnered video frame(s). As before, the ancillary data 537 garnered will be defined by the Working Papers specification 534.

After the video frame 536 and ancillary 537 database(s) are loaded with video frames and associated ancillary data as specified by the Working Papers 534, the video frame and associated ancillary digital data are identified by their metadata, flattened, and dispensed by the disclosed server 535 and loaded as image data on the imager database 541. All imager data stored in the imager database 541 is saved as ciphertext and not decrypted until the actual printing process has begun 543. The RIP 542 performs the decryption itself in real time via one or more symmetrical Key Encryption Keys (KEK) that were previously transmitted to the RIP encrypted with the RIP's asymmetrical public key.

One exemplary press configuration capable of producing the ticket or document embodiments of FIGS. 2A thru 2F, 4A, and 4B are illustrated 600 in FIG. 6A with the ticket or document embodiments of FIGS. 2A thru 2H and 4A thru 4D illustrated in the exemplary press configuration 625 of FIG. 6B. The FIG. 6A press configuration 600 featuring two sets of process color digital imagers, one for the front display and game play variable indicia 603 (shown magnified as callout 609) and the other for the back of the ticket 604 (shown magnified as callout 614) with the FIG. 6B press configuration 625 featuring three sets of process color digital imagers, one for the front display and game play variable indicia 603' (shown magnified as callout 609'), one for the back of the ticket 604' (shown magnified as callout 614'), and a third process color digital imager 632 (shown magnified as callout 626) for the Overprint or "OP."

As shown in FIG. 6A, press configuration embodiment 600 illustrates a modified hybrid flexographic and digital imager printing press used to produce variable indicia SOC secured tickets or documents that is typical in the industry. The press 600 unravels its paper web substrate from a roll 601 and flexographically prints 602 lower security layers in the scratch-off area as well as optionally primer. At this point, the press web enters a typically secured imager room where the front game play variable indicia are applied by imager 603. However, as disclosed herein with magnified view 609, the front game play variable indicia and display are digitally imaged as process colors with the separate Cyan 610, Magenta 611, Yellow 612, and black 613 print heads synchronized together to produce a common process color ("CMYK") display and game play variable indicia image on the front of the ticket. Imager 604 (shown magnified in 614) is utilized to digitally image CMYK process colors (615, 616, 617, and 618—respectively) on the ticket back. Next, a subsequent series of flexographic print stations 605 typically printing the upper security layers as well as, in this embodiment, any decorative overprint. At this point, the web can be rewound into a roll 606 for storage and ultimate processing by a separate packaging line.

The alternate FIG. 6B press configuration embodiment 625 illustrates a similar hybrid press to FIG. 6A with the addition of a third process color imager 632 for digitally imaging the OP. As before, press 625 unravels its paper web substrate from a roll 601' and flexographically prints 602' lower security layers in the scratch-off area as well as optionally primer. Again, the press web enters a secured imager room where the front game play variable indicia and display are applied by imager 603', which as shown in magnified view 609' imaged as process colors with CMYK (610', 611', 612', and 613' —respectively). Imager 604' (shown magnified in 614') is then utilized to digitally image CMYK process colors (615', 616', 617', and 618'—respectively) on the ticket back. Next, as before, a subsequent series of flexographic print stations 605' typically printing the upper security layers; however, in embodiment 625 a third digital imager 632 (shown magnified in 626) images a CMYK (627, 628, 629, and 630—respectively) OP on top of the SOC with static printing plate station 631 optionally providing a clear glossy varnish on top of the OP and/or display for added esthetics. Finally, the web can be rewound into a roll 606' for storage and ultimate processing by a separate packaging line.

The process color imagers represent one example embodiment of the present disclosure with other embodiments possible under some circumstances. For example, high-resolution monochromatic digital imagers could be employed for the front and back of the ticket instead of process color imagers, thereby resulting in a cost savings.

Other variations of the disclosed embodiments that would be apparent to anyone skilled in the art in view of the present disclosure and would be within the parameters of the appended claims.

What is claimed is:

1. Lottery tickets for a lottery game, the lottery tickets comprising:
 a first lottery ticket comprising:
  a first substrate comprising a first variable indicia portion and a first display portion;

first thematically related variable indicia printed on the first variable indicia portion of the first substrate and comprising images from a first video frame of a video;
a scratch-off coating over the first thematically related variable indicia; and
a first thematically related video frame of the video printed on the first display portion, the first thematically video frame being one of a plurality of different video frames of the video; and
a second lottery ticket comprising:
a second substrate comprising a second variable indicia portion and a second display portion;
second thematically related variable indicia printed on the second variable indicia portion of the second substrate and comprising images from a second video frame of the video;
a scratch-off coating over the second thematically related variable indicia; and
a second thematically related video frame of the video printed on the second display portion, the second thematically related video frame being one of the plurality of different video frames of the video; and
the images of the second thematically related variable indicia being different than the images of the first thematically related variable indicia,
the second thematically related video frame being different than the first thematically related video frame.

2. The lottery tickets of claim 1, wherein the first video frame is the first thematically related video frame.

3. The lottery tickets of claim 2, wherein the second video frame is the second thematically related video frame.

4. The lottery tickets of claim 1, wherein the second video frame is the second thematically related video frame.

5. The lottery tickets of claim 1, wherein the first lottery ticket includes a first code on the first substate that is usable to view a first portion of the video that starts at a first chronological time of the first thematically related video frame, and wherein the second lottery ticket includes a second code on the second substate that is usable to view a second portion of the video that starts at a second chronological time of the second thematically related video frame, wherein the first portion of the video is different than the second portion.

6. The lottery tickets of claim 5, wherein the first and second codes each comprise Quick Response (QR) codes.

7. The lottery tickets of claim 1, wherein the first variable indicia portion and the first display portion of the first substrate are detachable from each other, wherein the second variable indicia portion and the second display portion of the second substrate are detachable from each other, wherein the first variable indicia portion without the first display portion is redeemable for obtaining a first award, and wherein the second variable indicia portion without the second first display portion is redeemable for obtaining a second award.

8. The lottery tickets of claim 1, wherein the first thematically related variable indica are printed as process colors, and the second thematically related variable indica are printed as process colors.

9. A method for printing an instant lottery ticket for a lottery game, the method comprising:
accessing an external video;
converting portions of the external video into separate digitized video frames;
storing the video frames in a video frame database;
receiving ancillary data associated with the external video;
linking portions of the ancillary data to the separate digitized video frames;
storing the linked ancillary data in a database;
using an instant ticket game generator to create a set of paired inventory control and validation numbers for the lottery game;
pseudo randomly assigning prize values to the set of inventory control and validation numbers for the lottery game;
linking the separate digitized video frames and associated ancillary data to the set of paired inventory control and validation numbers;
flattening each of the paired inventory control and validation numbers and separate digitized video frames and associated ancillary data into separate flattened images in a format that is compatible with an on-press Raster Image Processor (RIP); and
using the on-press RIP and an imager to:
print one of the separate flattened images onto a ticket substrate, and
cover a portion of the ticket substrate with a scratch-off coating.

10. The method of claim 9, wherein the ancillary data is linked to the separate digitized video frames with time tags depicting elapsed times the video frames appear within the external video.

11. The method of claim 9, wherein the database storing the ancillary data is the video frame database.

12. The method of claim 9, which comprises converting the separate flattened images to a Portable Network Graphics (PNG) format.

13. The method of claim 9, which comprises using a mixer to link the separate digitized video frames and associated ancillary data to the set of paired inventory control and validation numbers, wherein the mixer is separate from the instant ticket game generator.

14. The method of claim 9, which comprises printing the separate digitized video frames on a plurality of ticket substrates in chronological order with respect to the external video.

15. The method of claim 9, wherein the separate flattened image printed on the ticket substrate comprise printed variable indicia that correspond to a portion of an image from the external video.

16. The method of claim 15, wherein the printed variable indicia comprises a drawing rendering of the portion of the image.

17. The method of claim 9, wherein the linked ancillary data comprises printed dialog text.

18. The method of claim 17, wherein the printed linked ancillary data dialog text corresponds to an elapsed time period of the digitized video frame of the instant lottery ticket.

19. The method of claim 9, wherein the linked ancillary data corresponds to an elapsed time from a start of the external video source to the digitized video frame of the instant lottery ticket.

20. The method of claim 9, wherein the linked ancillary data corresponds to printed dialog text not occurring around the time of the digitized video frame of the instant lottery ticket.

* * * * *